United States Patent [19]
Yoshida et al.

[11] Patent Number: 5,462,343
[45] Date of Patent: Oct. 31, 1995

[54] HYDRAULIC PRESSURE BOOSTER HAVING BOOSTER PISTON AND VALVE MECHANISM ASSOCIATED WITH MECHANICALLY OPERATED AND ELECTRICALLY CONTROLLED PRESSURE REGULATORS

[75] Inventors: Hiroaki Yoshida, Mishima; Masashi Ohta, Susono; Akira Nakamura, Tagata, all of Japan

[73] Assignee: Toyota Jidosha Kabushiki Kaisha, Toyota, Japan

[21] Appl. No.: 338,862

[22] Filed: Nov. 14, 1994

[30] Foreign Application Priority Data

Nov. 18, 1993 [JP] Japan ..................... 5-289215

[51] Int. Cl.⁶ ........................................ B60T 8/32
[52] U.S. Cl. .................. 303/114.1; 60/545; 60/547.1; 188/358; 303/117.1; 303/119.1; 303/122.09
[58] Field of Search ............... 303/114.1; 188/358, 188/359; 60/547.1, 545, 562, 563, 589, 555; 303/113.1, 117.1, 119.1, 13–14, 10–12, 92, 100, 110, 84.1, 84.2

[56] References Cited

U.S. PATENT DOCUMENTS 4,902,075  2/1990  Uno et al. ................. 303/114.1
5,234,086  8/1993  Matsuda et al. ................. 188/358

FOREIGN PATENT DOCUMENTS 63-20256  1/1988  Japan.
1-76363   5/1989  Japan.
5-120686  5/1993  Japan.

Primary Examiner—Douglas C. Butler
Attorney, Agent, or Firm—Oliff & Berridge

[57] ABSTRACT

A pressure boosting device as used in a vehicle brake system or other hydraulically operated system wherein the boosting device is connected to a mechanically operated pressure regulator for producing a manually controlled pressure, an electrically controlled pressure regulator and a hydraulically operated actuator, and includes a booster piston for boosting an electrically controlled pressure produced by the electrically controlled pressure regulator so that the boosted pressure is applied to the actuator, and a valve mechanism having an open and a closed position which are established when the booster piston is placed in its original position and moved away from the original position, respectively. In the open position, the actuator communicates with the mechanically operated pressure regulator. In the closed position, the actuator is disconnected from the mechanically operated pressure regulator, to permit the booster piston to boost the electrically controlled pressure.

18 Claims, 8 Drawing Sheets

HYDRAULIC PRESSURE BOOSTER HAVING BOOSTER PISTON AND VALVE MECHANISM ASSOCIATED WITH MECHANICALLY OPERATED AND ELECTRICALLY CONTROLLED PRESSURE REGULATORS

BACKGROUND OF THE INVENTION

Field of the Invention

The present invention relates in general to a hydraulically operated system, in particular, a hydraulically operated braking system, and more particularly to such hydraulically operated system which has a mechanically operated and manually controlled hydraulic pressure control device and an electrically controlled hydraulic pressure control device.

Discussion of the Related Art

A pressure level of a working fluid used for an actuator can be more easily regulated when the pressure level is electrically controlled by an electrically controlled device than when it is mechanically controlled by a mechanically operated device according an operating force acting on the mechanically operated device. Generally, however, an electrically controlled hydraulic pressure control device is less reliable than a mechanically operated hydraulic pressure control device. In view of these advantage and drawback of the electrically controlled pressure control device, there has been proposed a hydraulically operated system which has a mechanically operated pressure control device and an electrically controlled pressure control device, for regulating the pressure of the working fluid used for an actuator. This hydraulically operated system enjoys the advantage of the electrically controlled pressure control device while compensating or obviating the drawback of the same by using the mechanically operated pressure control device.

The hydraulically operated system of the type indicated above is embodied as a brake system for a motor vehicle, for example. An example of a hydraulically operated brake system of this type is disclosed in JP-A-63-20256, wherein a pressure selecting device is connected to a mechanically operated pressure control device in the form of a master cylinder, an actuator in the form of a wheel brake cylinder for applying braking to a vehicle wheel, and an electrically controlled pressure control device. The pressure selecting device is operated according to a difference between the hydraulic pressures generated by the mechanically operated master cylinder and the electrically controlled pressure control device, so that the electrically controlled pressure produced by the electrically controlled pressure control device is applied to the wheel brake cylinder when the electrically controlled pressure control device is normal, and the manually controlled pressure generated by the master cylinder is applied to the wheel brake cylinder when the electrically controlled pressure control device is not normal. Thus, this brake system has a fail-safe function for operating the wheel brake cylinder in the event of any trouble associated with the electrically controlled pressure control device.

Several types of devices are known as the electrically controlled pressure control device. There will be described three typical types of the electrically controlled pressure control device.

The first type of electrically controlled pressure control device uses a spool valve of two-input type, as disclosed in the above-identified publication JP-A-63-20256, which includes a spool for selective fluid communication of the wheel brake cylinder with a hydraulic pressure source and a reservoir. The spool is adapted to receive an electrically controlled magnetic drive force and the hydraulic pressure in the wheel brake cylinder (hereinafter referred to as "brake cylinder pressure"), such that the magnetic drive force and a force based on the brake cylinder pressure act on the spool in the opposite directions. The brake cylinder pressure is regulated by the spool depending upon the electrically controlled magnetic drive force, so as to maintain equilibrium between the magnetic drive force and the force based on the brake cylinder pressure. The brake cylinder pressure which is thus electrically controlled by the spool valve is applied to the wheel brake cylinder.

The second type of electrically controlled pressure control device uses a spool valve of three-input type as disclosed in unexamined Japanese Patent Application No. 5-120686 (which was filed on Apr. 22, 1993 and has not been laid open at the time of filing of the present application). This spool valve includes a spool as used in the first type, but this spool receives the master cylinder pressure or a pressure (hereinafter referred to as "equivalent master cylinder pressure") substantially equal to the master cylinder pressure, as well as the brake cylinder pressure and the electrically controlled magnetic drive force, such that the brake cylinder pressure and the equivalent master cylinder pressure act on the spool in the opposite directions. The brake cylinder pressure is regulated by an operation of the spool so as to maintain equilibrium between the force based on the brake cylinder pressure and a sum of the magnetic drive force and a force based on the equivalent master cylinder pressure. Described more specifically, the brake cylinder pressure is regulated depending upon the equivalent master cylinder pressure when no magnetic drive force acts on the spool, and depending upon the sum of the magnetic drive force and force based on the equivalent master cylinder pressure when the electrically controlled magnetic drive force acts on the spool. In this type of device, the magnetic drive force is negative or positive. Namely, when the magnetic drive force is negative or acts on the spool in a direction opposite to the direction in which the equivalent master cylinder pressure acts on the spool, the spool valve functions as a pressure reducing valve which regulates the brake cylinder pressure (as the electrically controlled pressure) within a pressure range lower than a standard pressure range which is a range in which the brake cylinder pressure is regulated when the magnetic drive force is not applied to the spool. When the magnetic drive force is positive or acts on the spool in the same direction as the equivalent master cylinder pressure, the spool valve functions as a pressure booster valve which regulates the brake cylinder pressure within a range higher than the standard standard pressure range.

The third type of electrically controlled pressure control device uses a shut-off valve which includes a valving member operated by an electric current. The valving member has at least a pressure-increase position in which the wheel brake cylinder is in communication with the hydraulic pressure source and is disconnected from the reservoir, and a pressure-decrease position in which the wheel brake cylinder is in communication with the reservoir and is disconnected to the hydraulic pressure source. The brake cylinder pressure is raised and lowered when the valving member is placed in the pressure-increase and pressure-decrease positions, respectively. The valving member may have a pressure-hold position in which the wheel brake cylinder is disconnected from both of the reservoir and hydraulic pressure source, to hold the brake cylinder pressure.

The electrically controlled pressure control devices as described above suffer from relatively low pressure control capability particularly where there are restrictions or limitations on electric power available for the device. In the case of the electrically controlled pressure control device using the spool valve of two-input type discussed above, for example, the limited electric power consumption leads to difficulty to maximize the level of the electrically controlled pressure (e.g., brake cylinder pressure) obtained by the device. In the case of the device using the spool valve of three-input valve also discussed above, the limited electric power consumption creates problems such as insufficient reduction of the brake cylinder pressure when the spool valve functions as a pressure reducing valve, and insufficient boosting of the brake cylinder pressure when the spool valve functions as a pressure booster valve. The problem of the insufficient pressure reduction will be explained in detail, with respect to the preferred embodiments of the invention. In the case of the device using the shut-off valve discussed above, it is difficult to construct the shut-off valve with a sufficiently large cross sectional area of flow of the working fluid (brake fluid) so as to assure a sufficiently small resistance of the fluid flow through the shut-off valve. In an attempt to solve these problems, the assignee of the present application proposed a technique as disclosed in laid-open Publication No. 1-76363 of unexamined Japanese Utility Model Application, wherein a pressure boosting device is interposed between the electrically controlled pressure control device and the actuator, so that the pressure boosting device reduces the burden or role of the electrically controlled pressure controlled device.

The provision of the pressure selecting device and the pressure boosting device which have been described above assures only only improved hydraulic pressure control capability of the electrically controlled pressure control device, and the fail-safe operation of the brake system in the event of an electrical trouble with the system. However, the pressure selecting device and pressure boosting device constructed as separate structures inevitably increase the size of the hydraulically operated system as a whole.

SUMMARY OF THE INVENTION

It is therefore an object of the present invention to provide a hydraulically operated system such as a hydraulically operated brake system, in which the pressure selecting device and the pressure boosting device are integrated in a relatively small-sized single structure, and which assures both improved electrical hydraulic pressure control capability and a fail-safe function achievable in the event of electrical abnormality of the system.

The above object may be achieved according to one aspect of the present invention, which provides a pressure boosting device provided in a hydraulically operated system wherein the pressure boosting device is connected to a mechanically operated pressure control device, an electrically controlled pressure control device and a hydraulically operated actuator, the mechanically operated pressure control device producing a manually controlled hydraulic pressure whose level is regulated depending upon an operating force acting on the mechanically operated pressure control device, while the electrically controlled pressure control device producing an electrically controlled hydraulic pressure whose level is electrically regulated, the pressure boosting device comprises: (a) a stepped booster piston for boosting the electrically controlled hydraulic pressure produced by the electrically controlled pressure control device, so that the boosted electrically controlled hydraulic pressure is applied to the hydraulically operated actuator; and (b) a valve mechanism operated according to a movement of the booster piston. The valve mechanism has an open position in which the actuator communicates with the mechanically operated pressure control device, and a closed position in which the actuator is disconnected from the mechanically operated pressure control device and in which the booster piston is permitted to boost the electrically controlled hydraulic pressure. The valve mechanism is placed in the open position when the booster piston is placed in an original position thereof, and in the closed position when the booster piston is moved from the original position.

To produce the electrically controlled hydraulic pressure, the electrically operated pressure control device may be adapted to electrically regulate a hydraulic pressure received from a suitable hydraulic pressure source, which may be an electrically operated pressure generator other than the mechanically operated pressure control device. Alternatively, the electrically operated pressure control device may be adapted to electrically regulate the manually controlled hydraulic pressure produced by the mechanically operated pressure control valve, to obtain the electrically controlled hydraulic pressure.

In the pressure boosting device of the present invention constructed as described above, the stepped booster piston is operated to boost the electrically controlled pressure so that the boosted hydraulic pressure is applied to the actuator. Thus, the electrical pressure control capability of the electrically operated pressure control device is supplemented by the booster piston of the pressure boosting device, and the nominal capacity or load of the electrically controlled pressure control device. may be reduced.

While the electrically controlled pressure control device is normally functioning, the booster piston is moved from the original position as the electrically controlled hydraulic pressure is raised. While the electrically controlled pressure control device is not normal, the booster piston is held in its original position with the electrically controlled hydraulic pressure held at zero. In the present pressure boosting device, which is based on these facts, the valve mechanism is adapted to be opened and closed according to a movement of the booster piston, so that actuator is communicated with the mechanically operated pressure control device when the valve mechanism is placed in the open position, and so that the actuator is disconnected from the mechanically operated pressure control device when the valve mechanism is placed in the closed position. That is, the valve mechanism is opened in the event of any electrically trouble with the electrically operated pressure control device, since the booster piston is moved to the original position in this event. Thus, the manually controlled hydraulic pressure produced by the mechanically operated pressure control device is applied to the actuator in the event of such electrical trouble. On the other hand, the booster piston is moved away from the original position during normal operation of the electrically controlled pressure control device, so that the valve mechanism is closed, and the electrically controlled hydraulic pressure boosted by the booster piston is applied to the actuator.

As described above, the booster piston primarily functions not only as a pressure booster, but also as means for performing a fail-safe function, namely, as means for applying the manually controlled hydraulic pressure to the actuator, in the event of any electrical abnormality associated with the electrically controlled pressure control device. Thus, the number of the components of the pressure boosting device is reduced, and the pressure boosting device is accordingly simplified in construction and small-sized. Further, the fail-safe function is purely mechanical and does not depend upon any electrical signal. This means a high level of operating reliability of the pressure boosting device even in the event of any trouble with the electrically controlled pressure control valve.

The present pressure boosting device is preferably used in the hydraulically operated system which comprises an electrically operated hydraulic pressure source, and a pressure regulator for regulating a pressure received from the hydraulic pressure source to produce a regulator pressure such that the regulator pressure is substantially equal to the manually controlled hydraulic pressure. According to one preferred form of the invention, the pressure boosting device comprises: (1) a housing; (2) a first and a second piston which are received in the housing such that the first and second pistons are concentric with each other and connected to each other for axial movement as a unit; (3) a third piston received in the housing such that the third piston is associated concentrically with the first and second pistons and is axially movable, the first piston having at least a rear pressure-receiving surface remote from the second piston, the second piston having a rear and a front pressure-receiving surface, and the third piston having at least a front pressure-receiving surface, the rear pressure-receiving surface of the first piston receiving the electrically controlled pressure, the rear and front pressure-receiving surfaces of the second piston cooperating with the housing to define a first and a second pressure chamber, respectively, and receiving the manually controlled hydraulic pressure and a pressure in the actuator, respectively, and the front pressure-receiving surface of the third piston receiving the regulator pressure produced by the pressure regulator; and (4) a first and a second elastic sealing member which are fixedly disposed in the housing such that the second piston is movable between an advanced position and a retracted position thereof defined by the first and second sealing members. The second piston and the first and second sealing members permit bidirectional flows of a working fluid between the first and second pressure chambers when the second piston is placed in a neutral position thereof between the advanced and retracted positions. The second piston contacts the first and second sealing members when the second piston is placed in the advanced and retracted positions, respectively. The second piston and the first and second sealing members inhibit a flow of the fluid from the second pressure chamber toward the first pressure chamber and permitting a flow of the fluid from the first pressure chamber toward the second pressure chamber when the second piston is placed in the advanced position. The second piston and the first and second sealing members inhibit a flow of the fluid from the first pressure chamber toward the second pressure chamber and permitting a flow of the fluid from the second pressure chamber toward the first pressure chamber when the second piston is placed in the retracted position. The second piston and the first and second sealing members constitute the valve mechanism. The rear pressure-receiving surface of the first piston has an area larger than that of the front pressure-receiving surface of the second piston, whereby the first and second pistons cooperate to constitute the booster piston.

When the second piston is placed in the neutral position, the second piston and the first and second elastic sealing members permit the bidirectional flows of the working fluid between the first and second pressure chambers on the opposite sides of the second piston. To this end, the second piston and the housing may be constructed such that an annular gap is left between the outer circumference of the second piston and the corresponding inner surface of the housing, so that the fluid flows between the first and second pressure chambers through this annular gap. In an alternative arrangement, the second piston is received in the housing fluid-tightly and axially slidably, and has an axial fluid passage formed therethrough such that the axial fluid passage is open to the first and second fluid chambers and is closed at its opposite open ends by the first and second sealing members, respectively, when the second piston contact the first or second sealing member.

In the above preferred form of the pressure boosting device, the housing has the first and second fluid chambers on the opposite sides of the second piston, and the first and second sealing members are disposed in the housing such that the second piston is engageable with these sealing members when the second piston is moved to the advanced and retracted positions, by the pressures acting on the first, second and third pistons. The first, second and third pistons and the first and second sealing members cooperate to boost the electrically controlled hydraulic pressure and perform the fail-safe function as described above.

Described more specifically, while the electrical system for the brake system is normal and the electrically controlled pressure control device is normally functioning, the first and second pistons are advanced as a unit from their neutral position as the electrically controlled hydraulic pressure is increased from zero. The second piston eventually contacts the first elastic sealing member whereby the valve mechanism is closed. The area of the rear pressure-receiving surface of the first piston which receives the electrically controlled hydraulic pressure is larger than that of the front pressure-receiving surface of the second piston which receives the pressure in the actuator, so that the first and second pistons cooperate to function as the booster piston for boosting the electrically controlled hydraulic pressure at the boosting ratio which is the ratio of the areas of the rear and front pressure-receiving areas of the first and second pistons. The electrically controlled hydraulic pressure boosted by the booster piston (first and second pistons) is applied to the actuator. When the electrically controlled pressure control device functions as a pressure reducing valve, the second piston of the booster piston is moved away from the first sealing member, passes the neutral position and eventually contacts the second sealing member. In this case, too, the pressure in the actuator is controlled depending upon the electrically controlled hydraulic pressure.

During boosting of the electrically controlled hydraulic pressure by the booster piston, the regulator pressure substantially equal to the manually controlled hydraulic pressure acts on the booster piston via the third piston, in a direction opposite to the direction in which the manually controlled hydraulic pressure acts on the booster piston via the second piston. In this respect, it is desirable that the area of the front pressure-receiving surface of the third piston is equal to that of the rear pressure-receiving surface of the second piston, so that a force based on the manually controlled hydraulic pressure acting on the booster piston is offset by a force based on the regulator pressure also acting on the booster piston. Accordingly, the boosting ratio of the booster piston can be more easily adjusted (for example, without having to increase the diameter of the booster piston), than when the force based on the manually controlled hydraulic pressure is not offset by the regulator pressure.

In the event of an electrical trouble associated with the electrically controlled pressure control device, neither the electrically controlled hydraulic pressure nor the regulator pressure are raised. In this event, the booster piston receives only the manually controlled hydraulic pressure and the pressure in the actuator, with the above-indicated first and second pressure chambers communicating with each other. Therefore, the booster piston is held in its original position, and the second piston is held apart from the first or second sealing member, namely, the valve mechanism is in the open position, so that the manually controlled hydraulic pressure is applied to the actuator through the present pressure boosting device. Thus, the present device performs the fail-safe function in the event of abnormal functioning of the electrically controlled pressure control device.

It will be understood that the preferred form of the pressure boosting device discussed above is simplified in construction, and available at a reduced cost with improved operating characteristics. Further, the booster piston provides a relatively large boosting ratio, without increasing the size of the piston, particularly where the second and third pistons are adapted so that the force based on the manually controlled hydraulic pressure is offset by the force based on the regulator pressure produced by the pressure regulator.

The object indicated above may also be achieved according to a second aspect of the present invention, which provides a hydraulically operated brake system for a motor vehicle having at least one wheel, comprising: (1) a mechanically operated master cylinder for producing a manually controlled hydraulic pressure whose level is regulated depending upon an operating force acting on the master cylinder; (2) an electrically controlled pressure control device for producing an electrically controlled hydraulic pressure whose level is electrically regulated; (3) a wheel brake cylinder for braking each of the at least one wheel; and (4) a pressure boosting device connected to the master cylinder, the electrically controlled pressure control device and the wheel brake cylinder, the pressure boosting device including (a) a stepped booster piston for boosting the electrically controlled hydraulic pressure produced by the electrically controlled pressure control device, so that the boosted electrically controlled hydraulic pressure is applied to the wheel brake cylinder, and (b) a valve mechanism operated according to a movement of the booster piston, the valve mechanism having an open position in which the wheel brake cylinder communicates with the master cylinder, and a closed position in which the wheel brake cylinder is disconnected from the master cylinder and in which the booster piston is permitted to boost the electrically controlled hydraulic pressure. The valve mechanism is placed in the open position when the booster piston is placed in an original position thereof, and in the closed position when the booster piston is moved from the original position.

The present brake system according to the second aspect of the invention enjoys the advantages of the pressure boosting device according to the first aspect of the invention described above. In particular, while the electrically controlled pressure control device is normally functioning, the valve mechanism is closed to permit the stepped booster piston to boost the electrically controlled hydraulic pressure so that the boosted pressure is applied to the wheel brake cylinder. In the event of any electrical failure or trouble with the electrically controlled pressure control device, the valve mechanism is opened to thereby permit communication between the master cylinder and the wheel brake cylinder, so that the manually controlled hydraulic pressure is applied to the wheel brake cylinder. Thus, the boosting device used in the present hydraulically operated brake system is capable of performing both the pressure boosting function and the fail-safe function, while maintaining a comparatively compact small-sized structure, as explained above in detail with respect to the first aspect of the invention.

According to a preferred form of the second aspect of the invention, the hydraulically operated brake system further comprises a first hydraulic pressure source, and a reservoir storing a working fluid, and the electrically controlled pressure control device comprises: (i) a spool operated for selective communication of the wheel brake cylinder with the first hydraulic pressure source and the reservoir, the spool receiving a pressure in the wheel brake cylinder and the manually controlled hydraulic pressure or an equivalent master cylinder pressure substantially equal to the manually controlled hydraulic pressure, the pressure in the wheel brake cylinder and the manually controlled hydraulic pressure or equivalent master cylinder pressure acting on the spool in opposite directions; and (ii) electrically operated drive force applying means for applying a magnetic drive force to the spool such that the magnetic drive force is electrically controllable. The spool is adapted to regulate the pressure in the wheel brake cylinder depending upon the manually controlled hydraulic pressure or equivalent master cylinder pressure, so as to maintain equilibrium between the pressure in the wheel brake cylinder and the manually controlled hydraulic pressure or equivalent master cylinder pressure when the magnetic drive force is not applied to the spool. The spool and the electrically operated drive force applying means regulate the pressure in the wheel brake cylinder depending upon a sum of the magnetic drive force and a force based on the manually controlled hydraulic pressure or equivalent master cylinder pressure, so as to maintain equilibrium between a force based on the pressure in the wheel brake cylinder and the above-identified sum, when the magnetic drive force is applied to the spool.

The equivalent master cylinder pressure may be the regulator pressure produced by the pressure regulator indicated above.

The first hydraulic pressure source may be the master cylinder or other pressure generator of varying-pressure type which is mechanically operated to produce a hydraulic pressure whose level varies depending upon an operating force acting on the pressure generator. Alternatively, the first hydraulic pressure source may be a constant-pressure type pressure source other than the master cylinder, which is electrically operated and controlled. For instance, the constant-pressure type pressure source consists of an accumulator circuit incorporating a pump, a motor for operating the pump, and an accumulator.

In the above preferred form of the brake system, the spool-type electrically controlled pressure control device is adapted to regulate the pressure in the wheel brake cylinder, so as to maintain equilibrium between the force based on the pressure in the wheel brake cylinder and the sum of the magnetic drive force and the force based on the manually controlled hydraulic pressure or equivalent master cylinder pressure. The spool-type pressure control device assures smooth and accurate control of the pressure in the wheel brake cylinder.

In a first advantageous arrangement of the above preferred form of the brake system, the electrically controlled pressure control device further comprises: a reaction piston which receives the pressure in the wheel brake cylinder and transmits a force based on the pressure in the wheel brake cylinder to the spool; and a pilot piston which receives as a pilot pressure the manually controlled hydraulic pressure and transmits a force based on the pilot pressure to the pilot piston such that the forces based on the pressure in the wheel brake cylinder and the pilot pressure act on the spool in opposite direction.

In a second advantageous arrangement of the same preferred form of the brake system, the electrically operated drive force applying means comprises a force motor including a movable coil and a permanent magnet, the force motor generating the magnetic drive force.

In a third advantageous arrangement of the above preferred form of the brake system, there is further provided a second hydraulic pressure source, and the first hydraulic pressure source comprises a pressure regulator for producing a regulator pressure to be applied to the electrically controlled pressure control device. The pressure regulator has a regulator pressure chamber which has the regulator pressure. The pressure regulator includes: a pilot piston which receives the manually controlled hydraulic pressure and the regulator pressure such that the manually controlled hydraulic pressure and the regulator pressure act on the pilot piston in opposite directions, the pilot piston being operated depending upon a difference between the manually controlled hydraulic pressure and the regulator pressure; and a shut-off valve which is opened and closed according to a movement of the pilot piston, to permit and inhabit communication between the second hydraulic pressure source and the regulator pressure chamber, respectively, so that the regulator pressure is substantially equal to the manually controlled hydraulic pressure.

In the above third advantageous arrangement, the second hydraulic pressure source may comprise a pump for pressurizing the working fluid, and an accumulator for storing the pressurized fluid from the pump such that a pressure of the pressurized fluid stored in the accumulator is held within a predetermined range.

According to a desirable feature of the above third advantageous arrangement, the pressure boosting device comprises: a housing; a booster piston received in the housing, the booster piston including a first and a second piston, and a first shaft portion which connects the first and second pistons such that the first and second pistons and the first shaft portion are coaxial with each other, the first piston and the first shaft portion being fluid-tightly and axially slidably received in the housing, while the second piston being axially movably received in the housing, with an annular gap left between the second piston and the housing, the first piston having a rear and a front pressure-receiving surface which receive the electrically controlled hydraulic pressure and an atmospheric pressure, respectively, the second piston having a rear and a front pressure-receiving surface which receive the manually controlled hydraulic pressure and the pressure in the wheel brake cylinder, respectively; and a second shaft portion extending from the second piston in a front direction away from the first piston such that the second shaft is coaxial with the first and second pistons and the first shaft portion. The second shaft portion includes an end portion which is fluid-tightly and axially slidably received in the housing. The end portion of the second shaft portion functions as a third piston having a front pressure-receiving surface which receives the regulator pressure.

In the above desirable feature of the brake system, the rear and front pressure-receiving surfaces of the first piston cooperate with the housing to define a pressure control chamber and an atmospheric pressure chamber which communicate with the electrically controlled pressure control device and an atmosphere, respectively, and the rear and front pressure-receiving surfaces of the second piston cooperate with the housing to define a master cylinder pressure chamber and a brake cylinder pressure chamber which communicate with the master cylinder and the wheel brake cylinder, respectively. The pressure boosting device may include a first and a second elastic sealing member which are fixedly disposed in the housing, In this case, the second piston permits bidirectional flows of the working fluid through the annular gap between the master cylinder pressure and the brake cylinder pressure chamber when the second piston is placed in a neutral position thereof apart from the first and second elastic sealing member. The second piston is adapted to contact the first elastic sealing member when the second piston is moved from the neutral position in a direction toward the brake cylinder pressure chamber, so that the second piston and the first elastic sealing member inhibit a flow of the fluid from the brake cylinder pressure chamber toward the master cylinder pressure chamber and permit a flow of the fluid from the master cylinder pressure chamber toward the brake cylinder pressure chamber when the second piston is in contact with the first elastic sealing member. Further, the second piston is adapted to contact the second elastic sealing member when said second piston is moved from the neutral position in a direction toward the master cylinder pressure chamber, so that the second piston and the second elastic sealing member inhibit a flow of the fluid from the master cylinder pressure chamber toward the brake cylinder pressure chamber and permit a flow of the fluid from the brake cylinder pressure chamber toward the master cylinder pressure chamber when the second piston is in contact with the elastic sealing member.

According to another desirable feature of the brake system suitable for a motor vehicle having four wheels, the wheel brake cylinder is provided for each of the four wheels, and the brake system further comprises: wheel speed sensors for detecting rotating speeds of the four wheels; a vehicle speed sensor for detecting a running speed of the motor vehicle; and a controller for electrically controlling the electrically controlled pressure control device to regulate the pressure in the wheel brake cylinders in an anti-lock manner, on the basis of output signals of the wheel speed sensors and the vehicle speed sensor, so as to prevent an excessive slip of the each wheel on a road surface upon braking of the each wheel.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
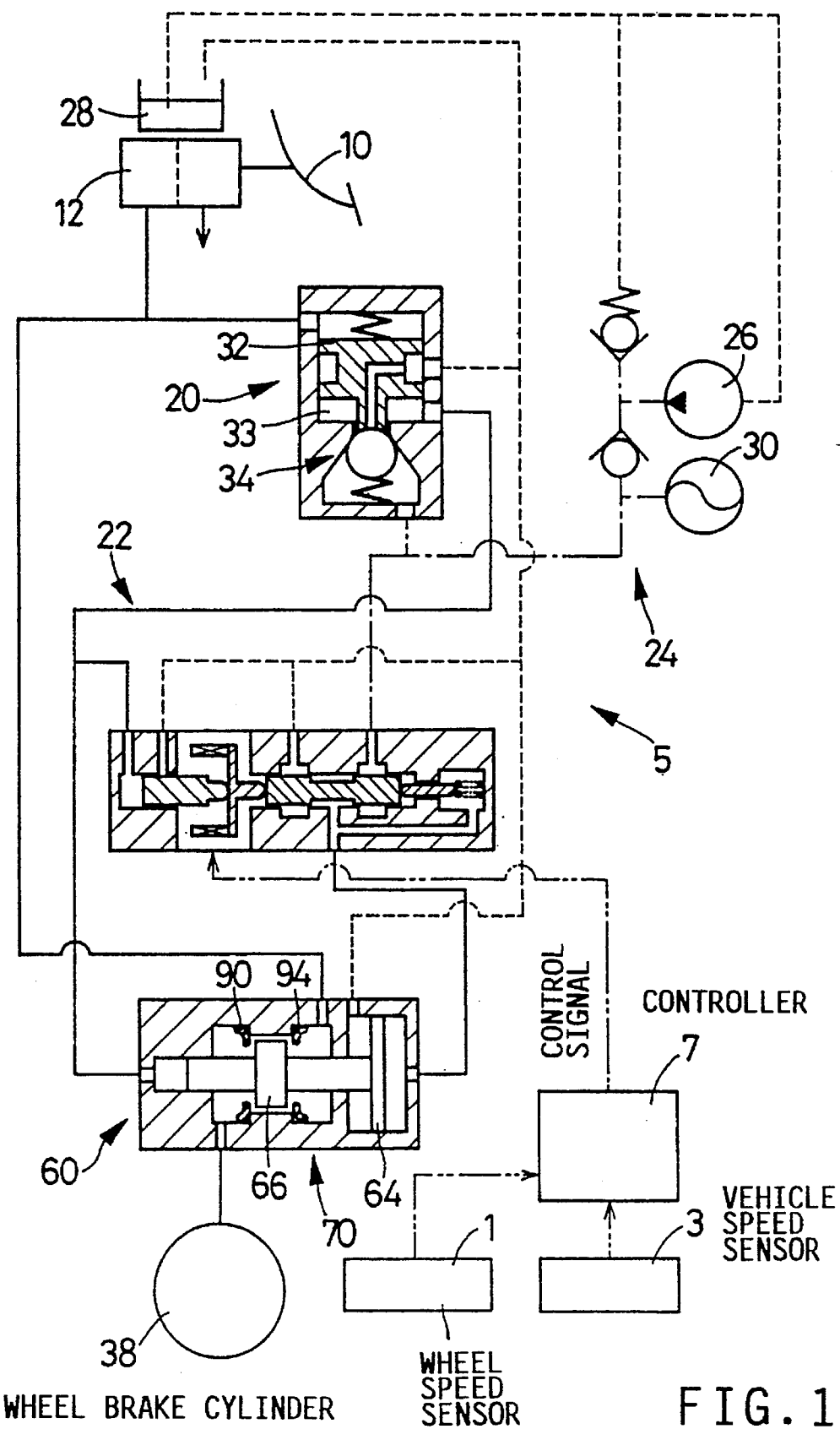
FIG. 1 is a schematic view of a part of a hydraulically operated vehicle braking system in the form of an anti-lock braking system constructed according to one embodiment of this invention, showing in cross section a pressure regulator, a pressure control valve and a boosting control device which are incorporated in the braking system.
Figure 3:
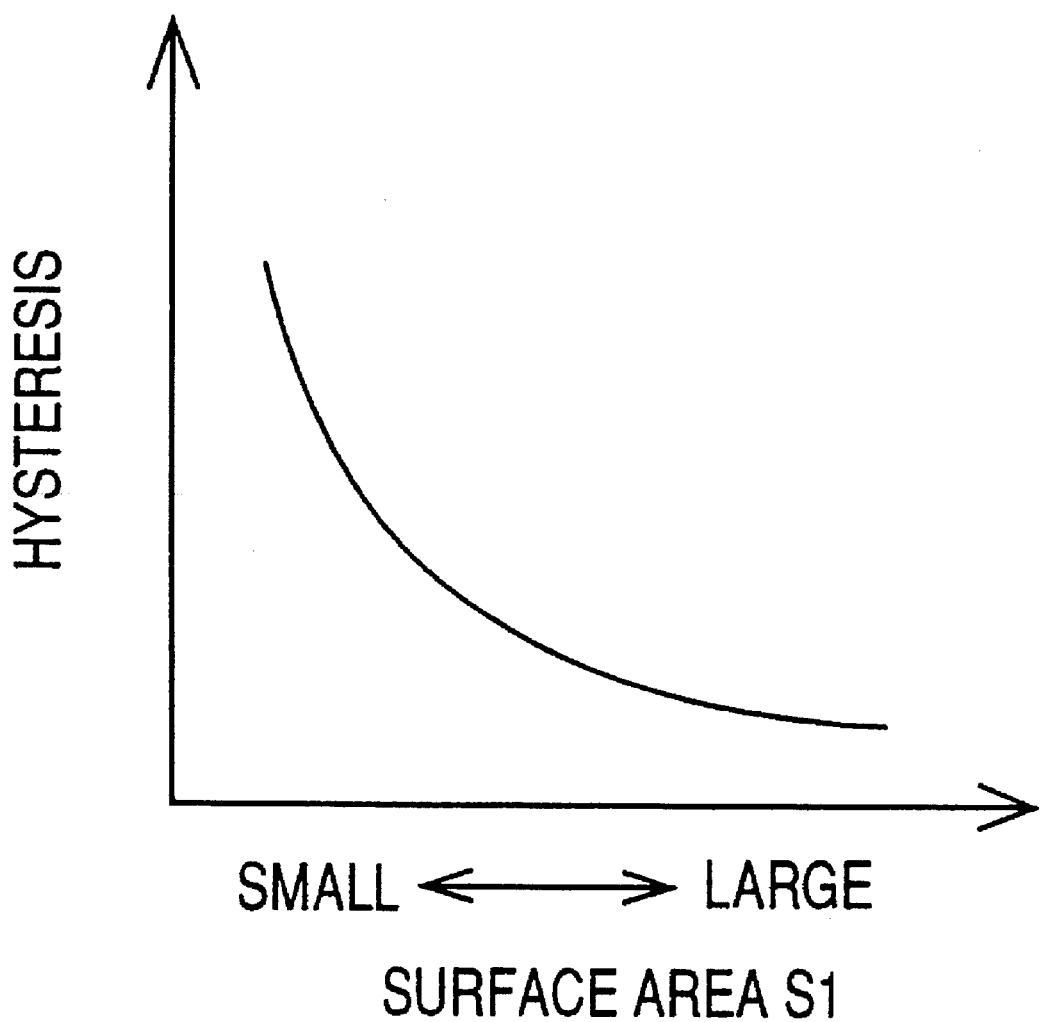
FIG. 3 is a graph indicating an example of a relationship between a pressure-receiving area S1 and the hysteresis of the pressure control valve of FIG. 2.
Figure 4:
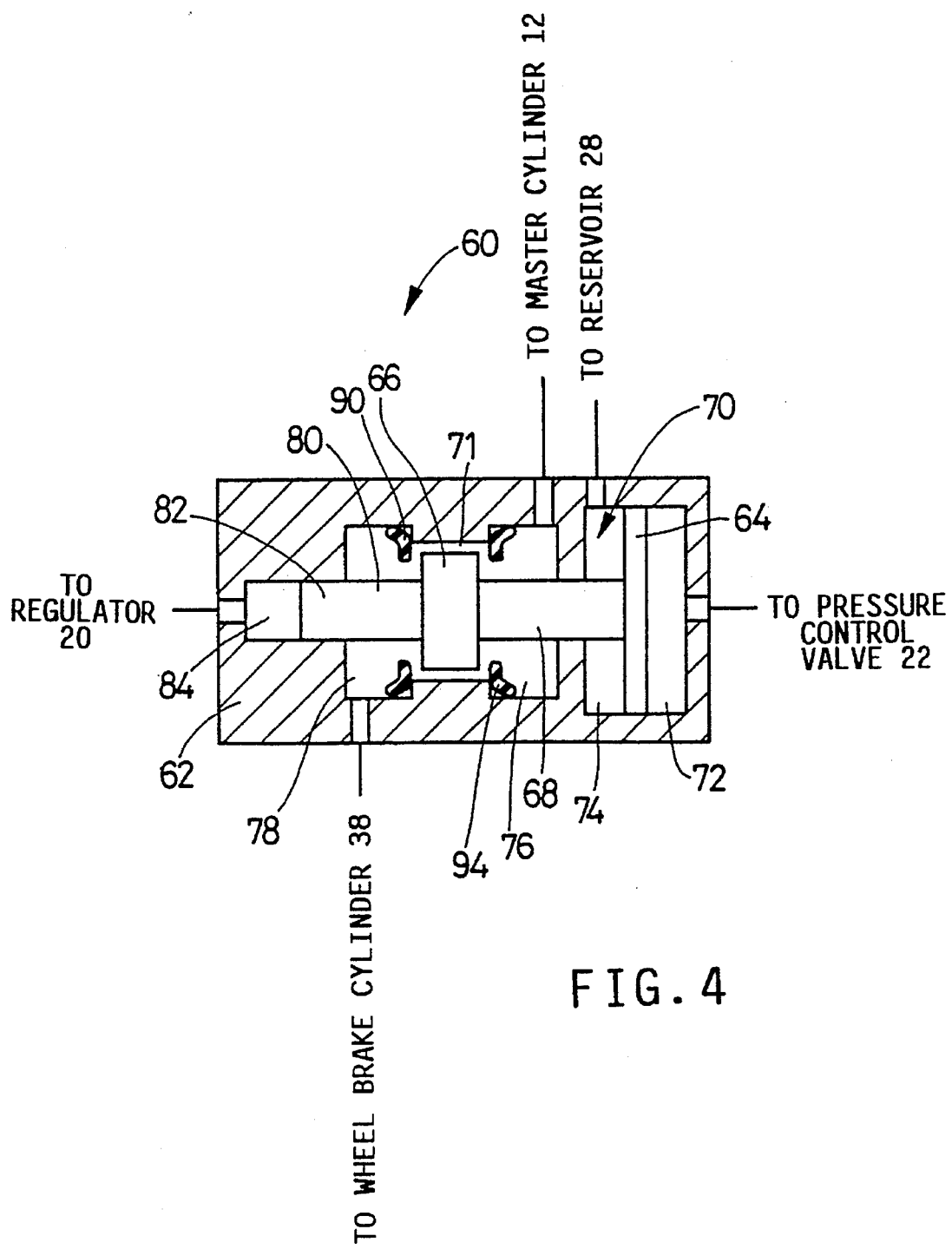
FIG. 4 is an enlarged elevational view in cross section of the boosting control device shown in FIG. 1.
Figure 5:
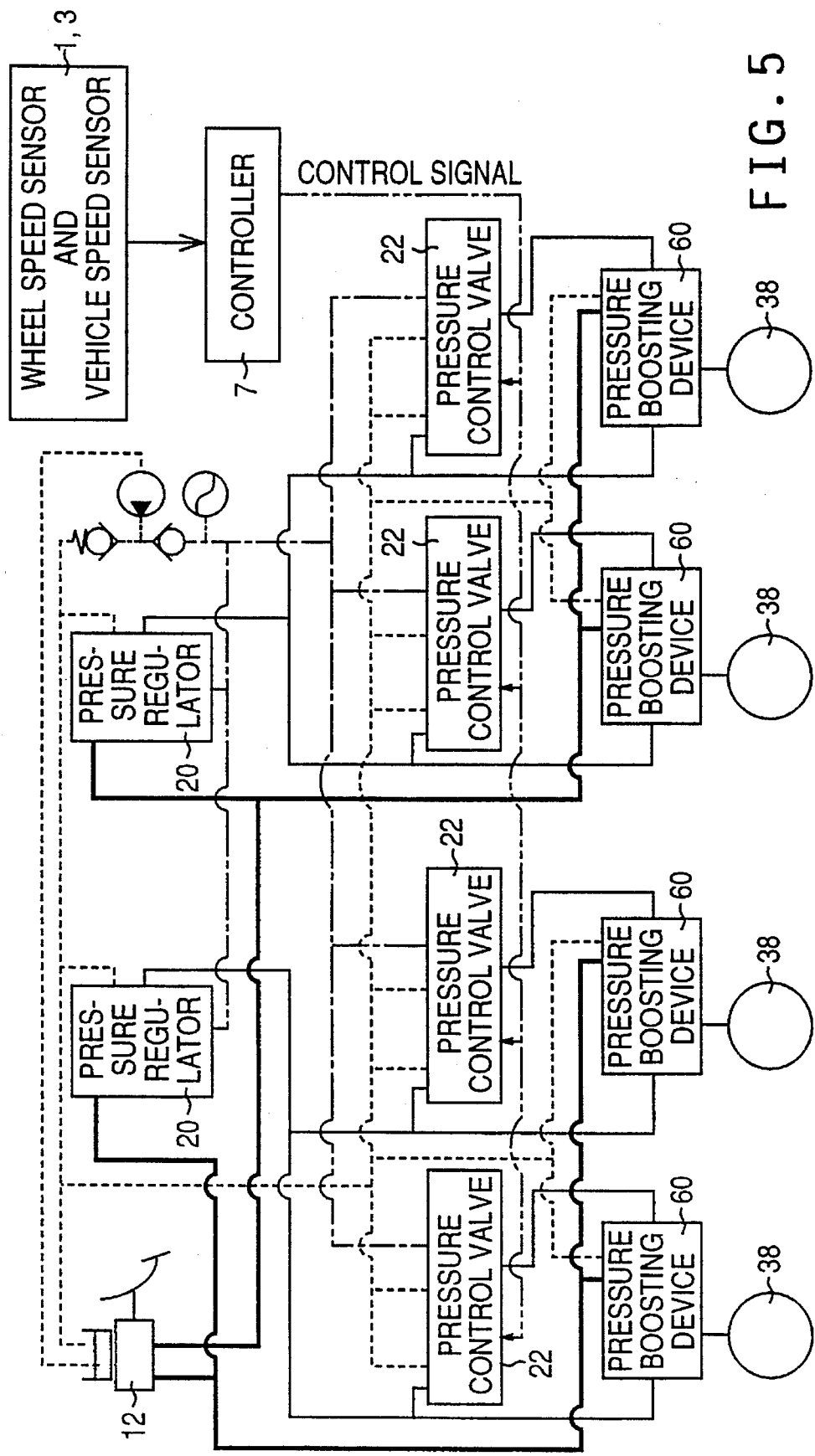
FIG. 5 is a schematic view showing the entirety of the braking system of FIG. 1.

Referring first to FIGS. 1–5, there is shown an example of a hydraulically operated braking system with an anti-lock pressure control device for a four-wheel motor vehicle, which is constructed according to one embodiment of the present invention. Each of the four wheels of the vehicle is provided with a wheel brake cylinder 38, as indicated in FIG. 5. However, only the wheel brake cylinder 38 for one of the four wheels is shown in FIG. 1, and only those elements of the braking system associated with that single wheel brake cylinder 38 are shown in FIG. 1.

The anti-lock pressure control device includes sensors for detecting the condition of the vehicle, such as a wheel speed sensor 1 for sensing the rotating speed of each wheel, and a vehicle speed sensor 3 for sensing the running speed of the vehicle. The anti-lock pressure control device further includes an electrically controlled pressure control device 5 adapted to electrically control the pressure (hereinafter referred to as "brake cylinder pressure" where appropriate) in each wheel brake cylinder 38, and a controller 7 for controlling the pressure control device 5 on the basis of signals received from the speed sensors 1, 3, so that the wheel cylinder pressure in each wheel brake cylinder is regulated so as to prevent locking of the wheels during brake application.

In FIG. 1, reference numeral 10 denotes a brake operating member in the form of a brake pedal, which is mechanically linked with a tandem-type master cylinder 12. The master cylinder 12 has two mutually independent pressurizing chambers which are disposed in tandem or in series with each other. The master cylinder 12 is constructed to mechanically produce a fluid pressure in the two pressurizing chambers, such that the level of the produced fluid pressure (hereinafter referred to as "master cylinder pressure" where appropriate) depends upon a magnitude of a force which acts on the brake pedal 10. Thus, the master cylinder pressure is a manually controlled hydraulic pressure which is controlled by the vehicle operator operating the master cylinder 12 by means of the brake pedal 10.

The master cylinder 12 is connected to the electrically controlled pressure control device 5 in the form of a pressure control valve 22 via a pressure regulator 20, which in turn is connected to an electrically operated hydraulic pressure source 24 (accumulator circuit) of constant-pressure type. The hydraulic pressure source 24 includes a hydraulic pump 26 which pressurizes the working fluid from a reservoir 28 and stores the pressurized fluid in an accumulator 30 such that the pressure (hereinafter referred to as "accumulator pressure" where appropriate) in the accumulator 30 is held within a predetermined range.

The pressure regulator 20 includes a pilot piston 32 which receives at one end thereof the master cylinder pressure as a pilot pressure. The pilot piston 32 cooperates with the housing of the pressure regulator 20 to define a regulator chamber 33 whose pressure (hereinafter referred to as "regulator pressure" where appropriate) is applied to the pressure control valve 22. The pilot piston 32 operates according to a pressure difference between the received pilot pressure (master cylinder pressure) and the regulator pressure. The pressure regulator 20 further includes a shut-off valve 34 which is opened and closed by a movement of the pilot piston 32, so that the accumulator pressure is applied to the regulator pressure 33 when the shut-off valve 34 is open, and is not applied to the regulator chamber 33 when the shut-off valve 34 is closed. Thus, the pressure regulator 20 operates to apply to the pressure control valve 22 the regulator pressure having the same level as the master cylinder pressure, such that the pressure regulator 20 permits a sufficient flow of the working fluid therethrough from the hydraulic pressure source 24 (accumulator 30) toward the pressure control valve 22.

Figure 2:
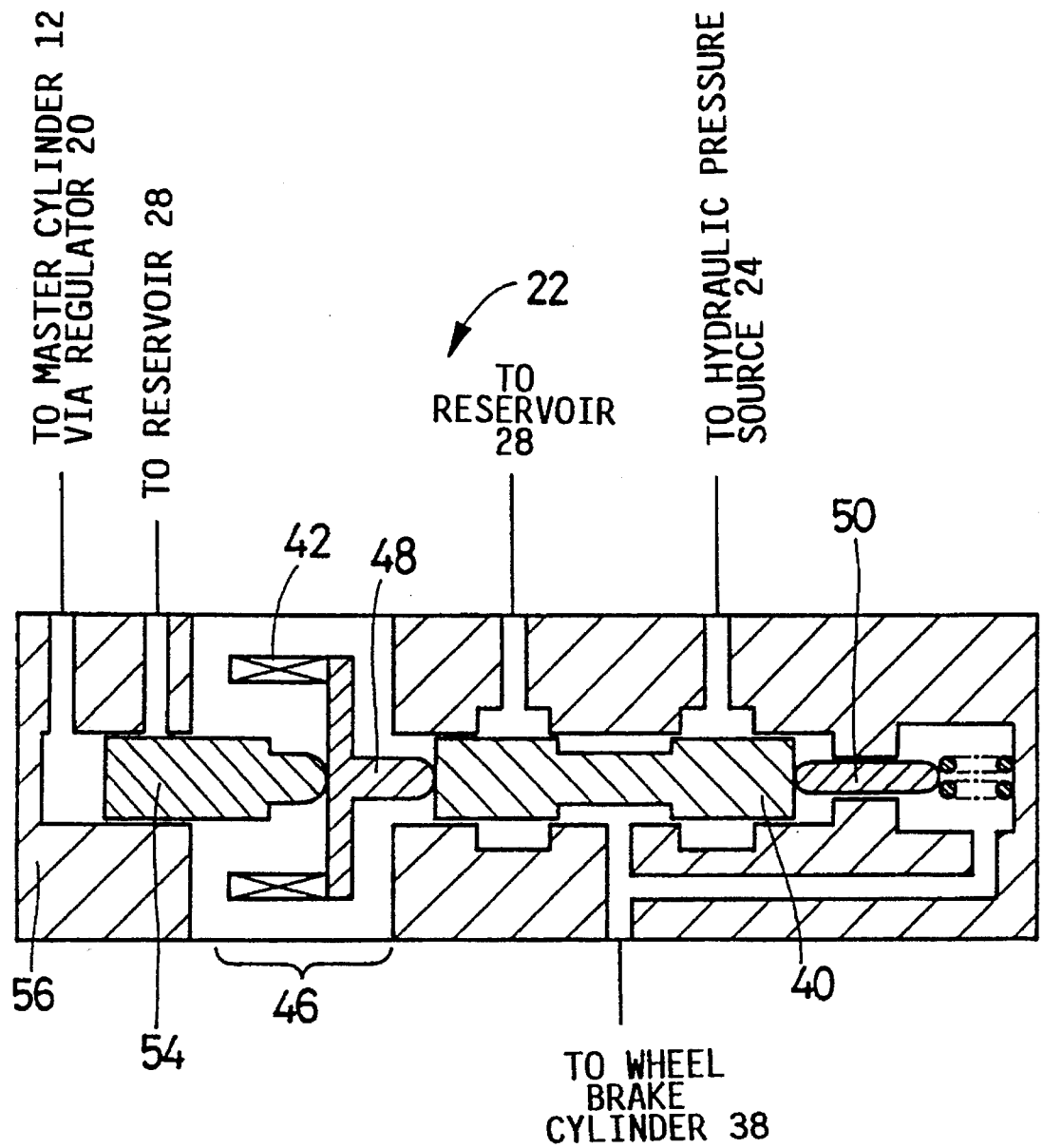
FIG. 2 is an enlarged elevational view in cross section of the pressure control valve shown in FIG. 1.

As shown in FIG. 2, in enlargement, the pressure control valve 22 has a spool 40 for fluid communication of the wheel brake cylinder 38 selectively with the hydraulic pressure source 24 and the reservoir 28. The spool 40 receives a magnetic drive force and the brake cylinder pressure received from the wheel brake cylinder 38. The magnetic drive force is produced by a linear actuator in the form of a force motor 46 which consists of a movable coil 42 and a permanent magnet (not shown).. The drive force acts on the spool 40 through a drive member 48. On the other hand, the brake cylinder pressure acts on the spool 40 through a reaction piston 50, so that the force acting on the spool 40 on the basis of the brake cylinder pressure is reduced. In the present pressure control valve 22, the master cylinder pressure also acts on the spool 40. Namely, a pilot piston 54 is disposed coaxially with the drive member 48 and spool 40 so that the master cylinder pressure received as a pilot pressure by the pilot piston 54 is transmitted to the spool 40 through the drive member 48, which is interposed between the pilot piston 54 and the spool 40. The direction in which the master cylinder pressure (pilot pressure) acts on the spool 40 is opposite to the direction in which the brake cylinder pressure acts on the spool 40.

As is apparent from the above explanation, the pressure control valve 22 is connected to the master cylinder 12, reservoir 28, hydraulic pressure source 24 and wheel brake cylinder 38. However, the pressure control valve 22 is not connected directly to the master cylinder 12 and wheel brake cylinder 38.

As shown in FIG. 1, the pressure control valve 22 is connected to the master cylinder 12 through the pressure regulator 20, so that the master cylinder pressure does not directly act on the pilot piston 54 of the valve 22, but the regulator pressure (in the regulator chamber 33 of the pressure regulator 20) directly acts on the pilot piston 54. In this respect, it is noted that the pilot piston 54 is fitted in a housing 56 of the valve 22, slidably and substantially fluid-tightly without any sealing member. The absence of any sealing member reduces the sliding resistance of the pilot piston 54, but would inevitably cause some leakage of the working fluid through a clearance between the pilot piston 54 and the housing 56, if the pilot piston 54 was adapted to directly receive the master cylinder pressure. On the other hand, a sealing member is provided in the pressure regulator 20, to secure a high degree of fluid tightness between the pilot piston 32 and the housing of the pressure regulator 20, so as to avoid leakage of the working fluid from the master cylinder 12. Further, the pressure regulator 20 is capable of applying the regulator pressure to the pressure control valve 22, with a sufficient amount of flow of the fluid from the hydraulic pressure source 24 toward the pressure control valve 22. For these reasons, the master cylinder pressure is applied to the pressure control valve 22 through the pressure regulator 20, such that the regulator pressure whose level is controlled to be equal the master cylinder pressure is applied to the pilot piston 54 of the pressure control valve 22.

On the other hand, the pressure control valve 22 is connected to the wheel brake cylinder 38 through a boosting control device 60, for the reasons explained below by reference to FIGS. 2 and 3.

In the pressure control valve 22, the following equation is satisfied:

$$Pm \cdot S_2 + F = Pc \cdot S_1$$

where,

Pm: master cylinder pressure (regulator pressure)

Pc: electrically controlled pressure (output pressure of the valve 22)

F: drive force produced by the force motor 46

$S_1$: pressure-receiving area of the reaction piston 50

$S_2$: pressure-receiving area of the pilot piston 54

Therefore, the electrically controlled pressure Pc obtained or controlled by the pressure control valve 22 is expressed by the following equation:

$$Pc = Pm \cdot S_2/S_1 + F/S_1$$

Since the pressure control valve 22 is designed such that the pressure-receiving area $S_2$ of the pilot piston 54 is larger than the pressure-receiving area $S_1$ of the reaction piston 50, the valve 22 functions to boost or increase the master cylinder pressure Pm at a ratio of $S_2/S_2$ when the drive force F is zero. When the drive force F is a negative value, the valve 22 functions to reduce the boosted master cylinder pressure Pm (boosted within the standard pressure range when the drive force F is zero), that is, serves as a pressure reducing valve. In the present embodiment, the pressure control valve 22 is operated to electrically control the brake cylinder pressure, only for the purpose of regulating the brake cylinder pressure in an anti-lock fashion. Accordingly, the drive force F is not made positive to boost the boosted master cylinder pressure Pm. However, the drive force F may be made positive when the brake cylinder pressure is regulated so as to control the deceleration value of the vehicle as described later. In this case, the pressure control valve 22 functions to boost the boosted master cylinder pressure Pm, that is, serves as a pressure booster valve.

In view of the above fact, it was discovered that a booster (vacuum booster or hydraulic booster) generally provided between the brake pedal and the master cylinder in an ordinary braking system could be eliminated, or a need for such booster could be reduced, if the pressure boosting function of the pressure control valve 22 is maximized. On the other hand, however, it was also found that the following problems would arise if the boosting ratio $S_2/S_1$ is maximized, that is, if the pressure-receiving area $S_1$ is minimized or the pressure-receiving area $S_2$ is maximized:

The following problems are considered where the pressure-receiving area $S_1$ is minimized. That is, reducing the pressure-receiving area $S_1$ increases a ratio of a sliding resistance f of the reaction piston 50 with respect to the reaction force generated by the reaction piston 50 based on the electrically controlled pressure Pc. As a result, the electrically controlled pressure Pc is likely to be easily influenced by the sliding resistance f. The electrically controlled pressure Pc is expressed by the following equation:

$$Pc = Pm \cdot S_2/S_1 + F/S_1 \pm f/S_1$$

The rightmost term of the right member of the above equation is a hysteresis affecting the electrically controlled pressure Pc. An example of the relationship between the pressure-receiving area $S_1$ and the magnitude of the hysteresis is illustrated in the graph of FIG. 3. the graph indicates that the hysteresis increases with a decrease in the pressure-receiving area $S_1$. Decreasing the pressure-receiving area $S_1$ is also undesirable, since it means reduction of the diameter of the reaction piston 50, which increases difficulty in manufacturing the reaction piston 50 with high accuracy.

Where the pressure-receiving area $S_2$ is maximized, the following problem is considered. In this case, a comparatively large force acts on the pilot piston 54 based on the master cylinder pressure Pm or regulator pressure Pr. In the present embodiment, however, the anti-lock pressure control device is designed such that the electrically controlled pressure Pc can be zeroed if necessary to perfectly avoid the locking of the wheel on an iced road surface or a road surface having an extremely low friction coefficient, even if the brake pedal 10 is operated by an extremely large depression force. In such event, therefore, the negative drive force F produced by the force motor 46 should overcome the large force acting on the pilot piston 54. However, electric power available on the vehicle is limited, and the drive force F that can be obtained by the force motor 46 is accordingly limited, whereby the amount of reduction of the electrically controlled pressure Pc is insufficient for controlling the brake cylinder pressure in the anti-lock fashion, where the depression force acting on the brake pedal 10 is considerably large.

Thus, there are restrictions that prevent the pressure control valve 22 from having a sufficiently high pressure boosting ratio while being capable of attaining a sufficient amount of reduction of the electrically controlled pressure Pc (brake cylinder pressure), with a minimum of hysteresis influencing the pressure Pc and under the limited electric power consumption.

For the above reasons, the boosting control device 60 is interposed between the pressure control valve 22 and the wheel brake cylinder 38, so that the electrically controlled pressure Pc produced by the pressure control valve 22 is boosted before it is applied to the wheel brake cylinder 38.

The boosting control device 60 has not only a function of boosting the electrically controlled pressure Pc (hereinafter referred to as "pressure boosting function"), but also a function of absorbing the working fluid delivered from the master cylinder 12 (hereinafter referred to as "fluid absorbing function"), and a function of assuring brake application to the vehicle by the master cylinder 12 in the event of a failure of or trouble with the hydraulic pressure source 24 or pressure control valve 22 (hereinafter referred to as "fail-safe function"). The fluid absorbing function is necessary to provide a relatively soft operating feel or low operational stiffness of the brake pedal 10, namely, to increase the operating stroke of the brake pedal 12 as the depression force acting thereon increases.

To begin with, there will be explained a significance of the fluid absorbing function in general.

In the present braking system, the working fluid (brake fluid) delivered from the master cylinder 12 upon brake application is entirely fed toward the pressure regulator 20. However, the volume of the chamber in the pressure regulator 20 which accommodates the fluid from the master cylinder does not vary considerably, and the amount of leakage of the fluid from that chamber into the regulator chamber 33 is substantially zero. Therefore, where the fluid pressures in all of the four vehicle wheels are electrically controlled and each of the two pressurizing chambers of the master cylinder 12 is connected to the pressure regulator 20, the amount of increase of the operating stroke of the brake pedal 10 is excessively small after the depression force is relatively large. In other words, only the depression force acting on the brake pedal 10 increases after the operating stroke reaches a certain value. That is, the brake pedal 10 has a relatively hard operating feel (relatively high operational stiffness), which is not desirable to the vehicle driver. To give the brake pedal 12 a relatively soft operating feel or a relatively small operational stiffness, the brake fluid can be discharged from the master cylinder 12 at a relatively constant rate over a wide range of the operating stroke of the pedal 10.

There will next be explained the reason why the pressure boosting device 60 must be assigned to perform the fluid absorbing function.

The fluid absorbing function can be achieved by a fluid absorbing device exclusively designed to absorb the brake fluid under pressure, as disclosed in JP-A-63-20256 identified above in the Discussion of the Related Art. This fluid absorbing device has the following drawback, for example. If the master cylinder 12 is used for emergency purpose, as a device effective to control the pressure in the wheel brake cylinder 38, in place of the electrically controlled pressure control valve 22, due to some electrical trouble with the brake system, the master cylinder 12 is connected directly to the wheel brake cylinder 38 as well as the fluid absorbing device. In this case, the brake fluid delivered from the master cylinder 12 is absorbed by not only the master cylinder 38 but also the fluid absorbing device. Accordingly, the operating stroke of the braking pedal 10 per a given depression force is excessively large, namely, the brake pedal 10 provides a very soft operating feel, in the event of an electrical trouble with the brake system. This means that the operating feel of the brake pedal 10 considerably varies in the event of the electrical trouble, as compared with that during normal operation of the brake system, whereby the operator of the vehicle has an anxiety about the operating reliability of the brake system. In the light of this drawback, the present brake system uses the pressure boosting device 60, which is constructed to permit consistent absorption of the brake fluid discharged from the master cylinder, even in the event of an electrical trouble with the brake system, so that the brake pedal 10 has consistent operational stiffness. The provision of the pressure boosting device 60 makes it possible to eliminate an exclusively designed fluid absorbing device, and leads to lowered cost of manufacture of the brake system.

A pilot-operated or an electromagnetic shut-off valve may be used with the pressure boosting device 60 and an exclusive fluid absorbing device, so that the shut-off valve by-passes the fluid absorbing device in the event of an electrical trouble with the brake system. In this case, the undesirable variation of the operational stiffness or operating feel of the brake pedal 10 in the event of such electrical trouble. However, this arrangement requires the exclusive shut-off valve as well as the exclusive fluid absorbing device, and increases the size and cost of the brake system.

The pressure boosting device 50 will be described in detail.

In function, the pressure boosting device 50 is a combination of a pressure booster and a pilot-operated shut-off valve. The pressure booster has a stepped booster piston adapted to boost the electrically controlled pressure Pc received from the pressure control valve 22, so that the boosted pressure is applied to the wheel brake cylinder 38. On the other hand, the pilot-operated shut-off valve has a pilot piston which receives the electrically controlled pressure Pc as a pilot pressure, and a valve mechanism which is operated depending upon a movement of the pilot piston so as to effect either fluid communication between the master cylinder 12 and the wheel brake cylinder 38 or disconnection of the master cylinder 12 and the wheel brake cylinder 38 from each other. The valve mechanism is held open when the received electrically controlled pressure Pc is lower than a given threshold level. When the electrically controlled pressure rises above the threshold level, the valve mechanism is operated, and the valve mechanism is closed, so that the pressure booster may function to boost the received electrically controlled pressure Pc.

Described more specifically by reference to FIG. 4, the pressure boosting device 60 has a housing 62 in which is slidably received a stepped booster piston 70 having a first piston 64, a second piston 66, and a shaft portion 68. The first and second pistons 64, 66 are connected by the shaft portion 68 coaxially or concentrically with each other, such that the pistons 64, 66 and shaft portion 68 are axially movable together as a unit. The first piston 64 and the shaft portion 68 are slidably and fluid-tightly fitted in the housing 62. However, an annular gap 71 is present between the the circumferential surface of the second piston 66 and the corresponding surface of the housing 62.

The rear surface (right surface in FIG. 4) of the first piston 64 and the housing 62 cooperate to define a control pressure chamber 72 communicating with the pressure control valve 22. The front or left surface of the first piston 64 cooperates with the housing 62 to define an atmospheric pressure chamber 74 communicating with the reservoir 28. Thus, the first piston 64 receives at its rear surface the electrically controlled pressure Pc and at its front surface the atmospheric pressure of the fluid from the reservoir 28. The housing 62 further cooperates with rear and front surfaces of the second piston 66 to define a master cylinder pressure chamber 76 and a brake cylinder pressure chamber 78 which communicate with the master cylinder 12 and the wheel brake cylinder 38, respectively. Thus, the second piston 66 receives at its rear surface the master cylinder pressure Pm and at its front surface the brake cylinder pressure Pr.

The booster piston 70 further has a shaft portion 80 extending from the front surface of the second piston 66. The shaft portion 80 is fluid-tightly and slidably fitted at its end portion in the housing 62, so that the shaft portion 80 functions as a third piston 82 which is coaxial or concentric with the first and second pistons 64, 66. The third piston 82 cooperates with the housing 62 to define a regulator pressure cheer 84 communicating with the pressure regulator 20. Thus, the third piston 82 receives at its front surface the regulator pressure Pr, so that a force which acts on the third piston 82 on the basis of the regulator pressure Pr in the chamber 84 offsets or counteracts with a force which acts on the second piston 66 on the basis of the master cylinder pressure Pm in the chamber 76. To this end, a pressure-receiving area Sr of the third piston 82 which receives the regulator pressure Pr is made equal to a pressure-receiving area Sm of the second piston 66 which receives the master cylinder pressure Pm.

When the booster piston 70 is placed in its neutral position as shown in FIG. 4, the second piston 66 bidirectional flows of the fluid between the master cylinder pressure chamber 76 and the brake cylinder pressure chamber 78 through the annular gap 71. When the booster piston 70 is advanced (moved in the left direction as seen in FIG. 4) from the neutral position, the front surface of the second piston 66 comes into fluid-tight contact with a first sealing member 90 (e.g., rubber lip seal). The first sealing member 90 has elasticity so that this sealing member 90 permits a flow of the fluid from the master cylinder chamber 76 into the brake cylinder chamber 78 when the second piston 66 is in contact with the sealing member 90. However, the sealing member 90 inhibits a flow of the fluid from the brake cylinder pressure chamber 78 into the master cylinder pressure chamber 76 under the above condition.

When the booster piston 70 is retracted (moved in the right direction as seen in FIG. 4) from the neutral position, the second piston 66 comes into fluid-tight contact with a second sealing member 94 (e.g., rubber lip seal). Like the first sealing member 90, the second sealing member 94 has elasticity so that the sealing member 94 permits a flow of the fluid from the brake cylinder pressure chamber 78 into the master cylinder pressure chamber 76 when the second piston 66 is in contact with the sealing member 94. However, the sealing member 94 inhibits a flow of the fluid from the master cylinder pressure chamber 78 into the brake cylinder pressure chamber 78 under the above condition.

The first piston 64 has a pressure-receiving area Sc receiving the electrically controlled pressure Pc. This pressure-receiving area Sc is made larger than a pressure-receiving area Sw of the second piston 66 which receives the brake cylinder pressure. Thus, the booster piston 70 is adapted so that the first and second pistons 64, 66 cooperate to boost the electrically controlled pressure Pc into the brake cylinder pressure to be applied to the wheel brake cylinder 38, with the second piston 66 held in contact with the first or second sealing member 90, 94.

There will be described an operation of the present pressure boosting device 60.

Initially, an operation of the pressure boosting device 60 without an anti-lock pressure control of the wheel brake cylinder 38 will be described, on an assumption that the hydraulic pressure source 24, pressure control valve 22 and pressure regulator 20 are all normally functioning. The operation "without an anti-lock pressure control" is interpreted to mean an operation of the device 50 while the drive force F generated by the force motor 46 of the pressure control valve 22 is zero (while the force motor 46 is off, and no magnetic drive force acts on the spool 40). In this case, the electrically controlled pressure Pc and the master cylinder pressure Pm have the relationship as expressed by the following equation:

$$Pc = Pm \cdot S_2/S_1$$

The above equation indicates that the master cylinder pressure Pm is boosted into the electrically controlled pressure Pc, with a boosting ratio of $S_2/S_1$. That is, when the drive force F=0, the pressure control valve 20 functions solely as a pressure booster.

While the brake pedal 10 is in the non-operated position with no depression force acting thereon, the master cylinder pressure Pm is zero, and the regulator pressure Pr is also zero, whereby the booster piston 70 is placed in the neutral position (original position) of FIG. 4 in which the second piston 66 is not held in contact with the first or second sealing member 90, 94, permitting fluid communication between the master cylinder 12 and the wheel brake cylinder 38.

When the brake pedal 10 is depressed in the above condition, the accordingly pressurized brake fluid starts to be delivered from the master cylinder 12, and fed into the wheel brake cylinder 38 through the master cylinder pressure chamber 76, annular gap 71 and brake cylinder pressure chamber 78. During an initial operation of the brake pedal 10, a "brake clearance" (e.g., a clearance between a friction pad actuated by the wheel brake cylinder 38 and the surface of a disc rotor rotating with the vehicle wheel) is eliminated, as well known in the art. In this period of operation, the brake pedal 10 is felt relatively soft by the vehicle operator, or provides a relatively low degree of operational stiffness as felt by the vehicle operator.

As the master cylinder pressure Pc is raised with a further depression of the brake pedal 10 while the booster piston 70 is placed in its neutral position, the wheel cylinder pressure is raised with the master cylinder pressure. At this time, the regulator pressure Pr is also raised with the master cylinder pressure Pm, and the electrically controlled pressure Pc begins to rise. Therefore, the booster piston 70 is substantially in a condition in which only the electrically controlled pressure Pc and the regulator pressure Pr act on the booster piston 70 in the opposite directions.

At this stage of operation, the electrically controlled pressure Pc is higher than the brake cylinder pressure, and the pressure-receiving area Sc of the first piston 64 receiving the pressure Pc is larger than the pressure-receiving area Sw of the second piston 66 receiving the brake cylinder pressure. Accordingly, an advancing force acts on the booster piston 70, whereby the booster piston 70 begins to be advanced.

Subsequently, the second piston 66 of the booster piston 70 is brought into contact with the first sealing member 90, so that the following equation is satisfied:

$$Pr \cdot Sr + Pw \cdot Sw = Pm \cdot Sm + Pc \cdot Sc$$

where,

Pr: regulator pressure (output pressure of the pressure regulator 20),

Pw: brake cylinder pressure (pressure in the wheel brake cylinder 38),

Pm: master cylinder pressure (pressure generated by the master cylinder 12), Sr: surface area of the third piston 82 which receives the regulator pressure Pr, Sw: surface area of the second piston 66 which receives the brake cylinder pressure Pw, Sm: surface area of the second piston 66 which receives the master cylinder pressure Pm, Sc: surface area of the first piston 64 which receives the electrically controlled pressure Pc.

Since Pr=Pm, and Sr=Sm, the electrically controlled pressure Pc and the brake cylinder pressure Pw have a relationship as expressed by the following equation:

$$Pw \cdot Sw = Pc \cdot Sc$$

Therefore, the electrically controlled pressure Pc is boosted into the brake cylinder pressure Pw at the boosting ratio of Sc/Sw. In other words, the regulator pressure Pr equal to the master cylinder pressure Pm acts on the booster piston 70 in the direction opposite to the direction in which the master cylinder pressure Pm acts on the piston 70. Consequently, the brake cylinder pressure Pw can be reduced to zero when the electrically controlled pressure Pc is zero even if the master cylinder pressure Pm is not zero.

When the brake pedal 10 is further depressed after the second piston 64 comes into contact with the first sealing member 90, the master cylinder pressure Pm rises, and the regulator pressure Pr and the electrically controlled pressure Pc also rise as the master cylinder pressure Pm rises. In the pressure boosting device 60, however, a rise of the master cylinder pressure Pm is offset by a rise of the regulator pressure Pr, and the booster piston 70 is substantially influenced by only a rise of the electrically controlled pressure Pc, whereby the booster piston 70 is advanced with the second piston 66 causing elastic deformation of the first sealing member 90. This advancing movement of the booster piston 70 with an increase in the electrically controlled pressure Pc permits an increase in the brake cylinder pressure Pw with the increase in the electrically controlled pressure Pc.

Further, an increase in the volume of the master cylinder pressure chamber 76 results in an increase in the amount of the brake fluid which the chamber 76 can receive from the master cylinder 12. Namely, the amount of the brake fluid from the master cylinder 12 that can be accommodated or absorbed by the pressure boosting device 60 is increased, whereby the operating stroke of the brake pedal 10 is increased as the depression force acting thereon is increased. This gives suitable operational stiffness of the brake pedal 10.

When the master cylinder pressure Pm is lowered as a result of a decrease in the depression force acting on the brake pedal 10 in the above condition, the electrically controlled pressure Pc is accordingly lowered, tending to retract the booster piston 70 toward the neutral position, whereby the brake fluid is discharged from the wheel brake cylinder 38 into the brake cylinder pressure chamber 78, and the booster piston 70 begins to be retracted.

With the depression force entirely removed from the brake pedal 10, the master cylinder pressure Pm is zeroed, and the regulator pressure Pr is accordingly zeroed. As a result, the second piston 66 of the booster piston 70 begins to be moved away from the first sealing member 90, and the master cylinder 12 is communicated with the wheel brake cylinder 38 through the chambers 76, 78 and the annular gap 71.

It will be understood from the above explanation that the following equation is satisfied when the electrical system of the brake system is normal:

$Pw \cdot Sw = Pc \cdot Sc$

Where the friction resistance f of the booster piston 70 is considered, the above equation may be expressed as follows:

$Pw \cdot Sw \pm f = Pc \cdot Sc$

The brake cylinder pressure Pw is expressed by the following equation:

$Pw = Pc \cdot Sc/Sw \pm f/Sw$

Thus, it will be understood that the boosting ratio of the depression force of the brake pedal 10 (brake operating force), namely, the ratio of a vehicle braking force with respect to the brake operating force can be increased by either reducing the pressure-receiving area Sw of the second piston 66 which receives the brake cylinder pressure Pw, or by increasing the pressure-receiving area Sc of the first piston 64 which receives the electrically controlled pressure Pc.

Where the pressure-receiving area Sw is reduced, there is a problem that the hysteresis adversely affecting the brake cylinder pressure Pw tends to increase. The term ($\pm f/Sw$) in the right member of the above equation represents the magnitude of the hysteresis, and a decrease in the pressure-receiving area Sw means an increase in the hysteresis.

Where the pressure-receiving area Sc is increased, no such problem of increased hysteresis will arise. That is, the pressure-receiving area Sc is independent of the hysteresis.

It will therefore be understood that increasing the pressure-receiving area Sc of the pressure boosting device 60 makes it possible to increase the boosting ratio while avoiding an increase in the hysteresis, even where the electric power available for the force motor 46 is limited. In other words, the boosting ratio can be comparatively easily increased without increasing the load of the electrically controlled pressure control valve 22, and with a high freedom of design, by simply designing the booster piston 70 such that the second piston 66 has the relatively large pressure-receiving area Sc.

There will next be described an operation of the pressure boosting device 60 when the brake cylinder pressure Pw is controlled in the anti-lock control fashion with the force motor 46 of the pressure control valve 22 activated so as to produce the drive force F.

Assuming that the brake cylinder pressure Pw is lowered when the second piston 66 is in contact with the first sealing member 90, the electrically controlled pressure Pc is expressed by the following equation:

$Pm \cdot S_2/S_1 + F/S_1$

On the other hand, the brake cylinder pressure Pw is expressed by the following equation:

$Pc \cdot Sc/Sw$

The above equation may be converted into the following equation:

$Pm \cdot S_2/S_1 \cdot Sc/Sw + F/S_1 \cdot Sc/Sw$

Further, the master cylinder pressure Pm and the brake cylinder pressure Pw have a relationship expressed by the following equation:

$Pw - Pm = Pm(S_2/S_1 \cdot Sc/Sw - 1) + F/S_1 \cdot Sc/Sw.$

Lowering the brake cylinder pressure Pw means that the drive force F is negative. However, when the absolute value of the drive force F is small, and Pw−Pm>0 (Pw>Pm), the second piston 66 of the booster piston 70 is held in contact with the first sealing member 90.

When the absolute value of the drive force F is relatively large, and Pw−Pm≦0 (Pw≦Pm), the brake fluid flow from the master cylinder pressure chamber 76 into the brake cylinder pressure cheer 78 through a gap between the rear surface of the first sealing member 90 and the surface of the second piston 66 (and the inner surface of the housing 62), whereby the volume of the brake cylinder pressure chamber 78 increases, and the booster piston 70 begins to be retracted. At this time, the brake cylinder pressure Pw is lowered with an increase in the absolute value of the drive force F, that is, with a decrease in the electrically controlled pressure Pc. Thus, the braking force to be applied to the corresponding wheel is reduced to reduce the amount of slip of the wheel on the road surface.

As the brake cylinder pressure Pw is further lowered with a further decrease in the electrically controlled pressure Pc, the brake cylinder pressure Pw is made equal to the master cylinder pressure Pm, and the second piston 66 begins to be spaced away from the first sealing member 90, whereby the master cylinder chamber 76 and the brake cylinder pressure chamber 78 communicate with each other. At this time, the electrically controlled pressure Pc is expressed by the following equation:

$$Pc=Pm \cdot Sw/Sc(>0).$$

With a further decrease in the electrically controlled pressure Pc, the booster piston 70 is retracted to the fully retracted position past the neutral position, and the second piston 66 comes into contact with the second sealing member 94. At this time, the brake cylinder pressure Pw is expressed by the following equation:

$$Pw=Pc \cdot Sc/Sw$$

The above equation indicates that it is possible to lower the brake cylinder pressure Pw to zero by lowering the electrically controlled pressure Pc to zero. Thus, the brake cylinder pressure Pw can be sufficiently lowered.

Where the master cylinder pressure Pm is increased and the electrically controlled pressure Pc is accordingly increased while the second piston 66 is in contact with the first sealing member 90, the booster piston 70 is advanced with the second piston 66 causing elastic deformation of the first sealing member 90.

Where the master cylinder pressure Pm and electrically controlled pressure Pc are increased while the second piston 66 is in contact with the second sealing member 94, the booster piston 70 is moved left to the neutral position with the second piston 66 being spaced away from the second sealing member 94, until the second piston 66 contacts the first sealing member 90. In this instance, the electrically controlled pressure Pc is boosted into the brake cylinder pressure Pw at the boosting ratio of Sc/Sw.

There will be described an operation of the depression force is removed from the brake system when the brake pedal 10.

When the depression force is removed from the brake pedal 10, the master cylinder pressure Pm is zeroed, and the regulator pressure Pr is also zeroed. If the removal of the depression force is effected while the second piston 66 is in contact with the first sealing member 90, the booster piston 70 begins to be retracted when the master cylinder pressure Pm is lowered below the brake cylinder pressure Pw. The booster piston 70 is returned to the neutral position with the second piston 66 being spaced away from the first sealing member 90. If the removal of the depression force from the brake pedal is effected while the second piston 66 is in contact with the second sealing member 94, the brake fluid is fed from the brake cylinder pressure chamber 78 into the master cylinder pressure chamber 76 through a gap between the second sealing member 94 and the second piston 66, when the master cylinder pressure Pm is lowered below the brake cylinder pressure Pw. As a result, the volume of the master cylinder pressure 76 is increased, causing the booster piston 70 to begin its advancing movement toward the neutral position.

While the operation of the present brake system while it is normally functioning has been described, an operation of the brake system in the event of some electrical trouble will be described.

There are several kinds of electrical trouble which may happen with the brake system. In the event of a failure of the hydraulic power source 24 (e.g., failure of the pump 26), for example, the accumulator pressure is zeroed, and the regulator pressure Pr is also zeroed, whereby the pressure control valve 22 is inoperable, that is, the electrically controlled pressure Pc is zeroed. In this case, only the master cylinder pressure Pm and the brake cylinder pressure Pw substantially act on the booster piston 70, and the booster piston 70 is kept in its neutral position. Accordingly, the master cylinder 12 is communicated with the wheel brake cylinder 38 through the pressure boosting device 60. As a result, neither the pressure control valve 22 nor the pressure boosting device 60 functions to boost the input pressure, but the pressure boosting device 60 functions to apply the master cylinder pressure Pm to the wheel brake cylinder 38, thus achieving the fail-safe function in the event of failure of the hydraulic source 24.

While the present brake system has been described above with respect to the master cylinder 12, pressure regulator 20, pressure control valve 22, pressure boosting device 60 and wheel brake cylinder 38 as far as one of the four wheels of the vehicle is concerned, there will be described the overall arrangement for all of the four wheels, referring to the schematic view of FIG. 5. In the embodiment illustrated in FIG. 5, the pressure control valve 22 and the pressure boosting device 60 are provided for each of the four wheels, that is, for each of the four wheel brake cylinders 38. Further, the pressure regulator 20 is provided for each of the two pressurizing chambers of the master cylinder 12.

Figure 6:
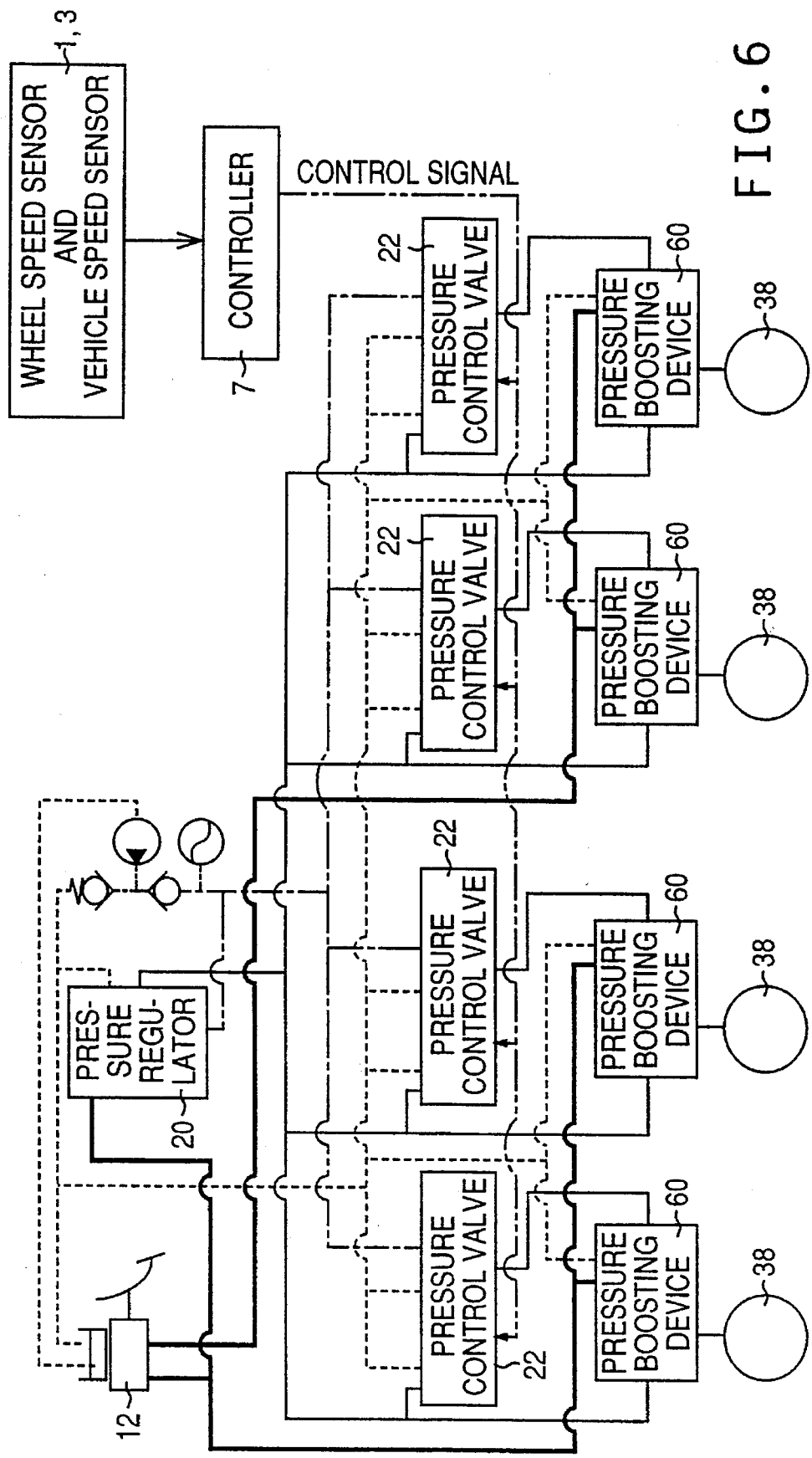
FIG. 6 is a schematic view of a vehicle braking system constructed according to another embodiment of the invention.
Figure 7:
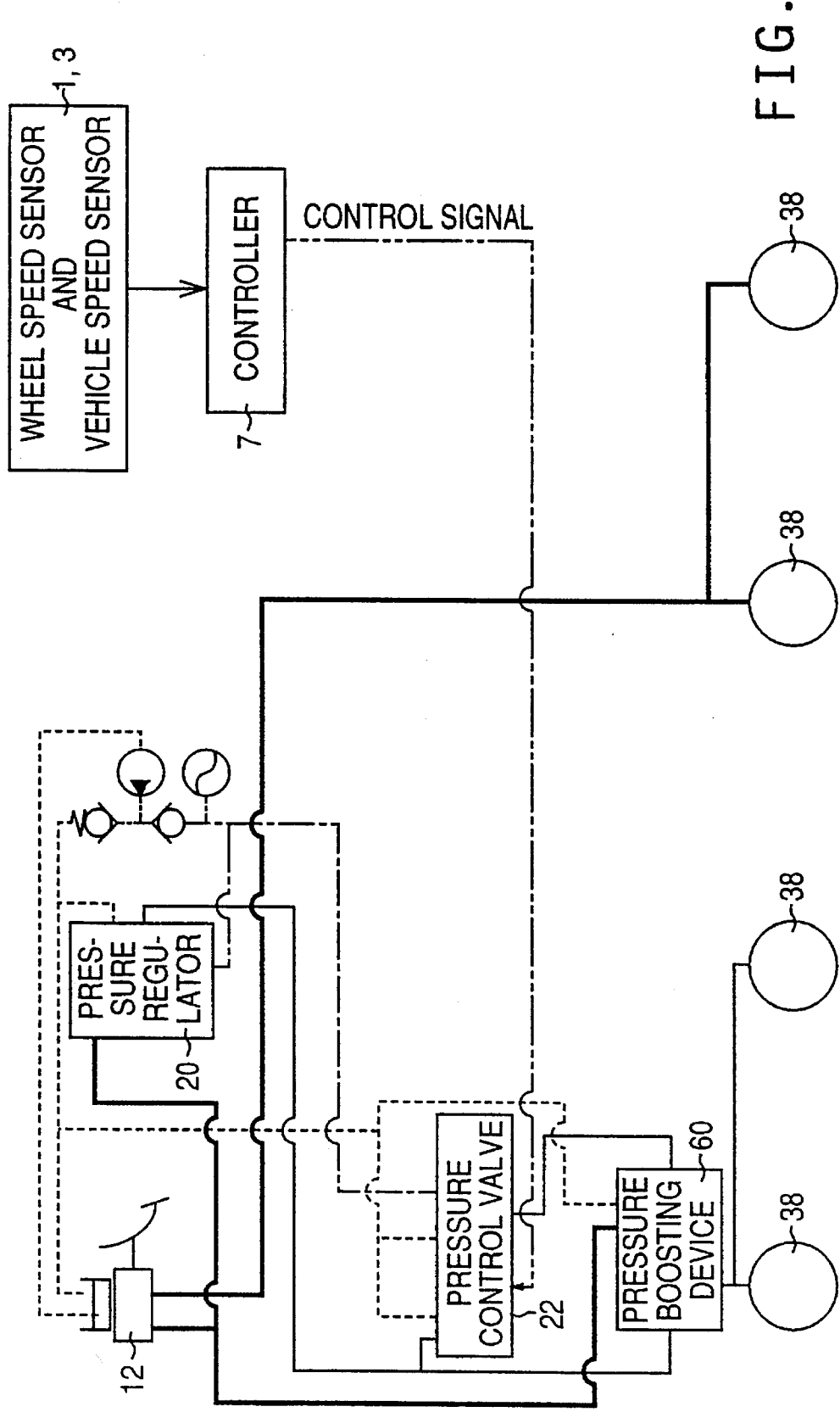
FIG. 7 is a schematic view of a vehicle braking system according to a further embodiment of the invention.
Figure 8:
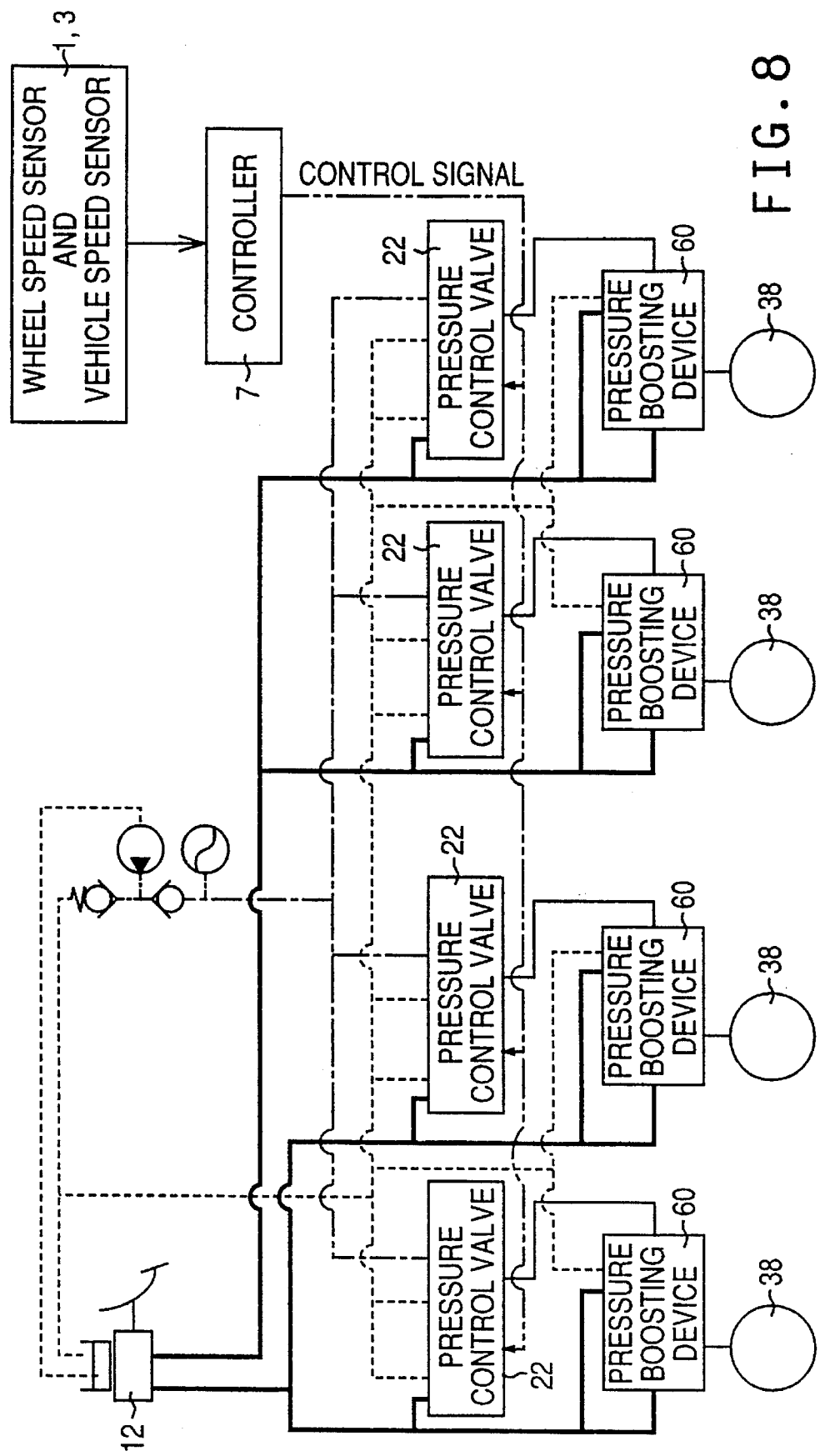
FIG. 8 is a schematic view of a vehicle braking system according to a still further embodiment of the invention.

However, the present invention may be otherwise embodied as illustrated in FIGS. 6–8.

In the modified embodiment of FIG. 6, only one pressure regulator 20 is used.

In the embodiment of FIG. 7, the pressure control valve 22 and the pressure boosting device 60 are provided for only the wheel brake cylinders 38 connected to one of the two pressurizing chambers of the master cylinder 12. The other pressurizing chamber is directly connected to the other two wheel brake cylinders 38, as in an ordinary brake system for a four-wheel vehicle. While only one pressure control valve 22 and only one pressure boosting device 60 are used commonly for the two wheel brake cylinders 38 connected to one of the two pressurizing chambers of the master cylinder 12, the valve 22 and device 60 may be used for each of those two wheel brake cylinders 38.

The pressure regulator 20 is not essential according to the principle of the present invention, and may be eliminated as in the embodiment of FIG. 8 in which the master cylinder 1.2 is connected to a pilot pressure chamber of the pressure control valve 22 for each of the four wheel brake cylinders 38, so that the master cylinder pressure Pm directly acts on the pilot piston 54 of each pressure control valve 22.

It will be understood from the foregoing description that the pressure controlled valve 22 functions as the device which is electrically controlled to regulate the regulator pressure Pr for producing the electrically controlled pressure Pc. It will be further understood that the second piston 66 and the first and second sealing members 90, 94 of the pressure boosting device 60 cooperate to constitute a valve mechanism which has an open position and a closed position. It is also noted that the force motor 46 functions as means for applying the magnetic drive force F to the spool 40 such that the drive force F is electrically controllable.

While the present invention has been described in detail in its presently preferred embodiments by reference to the accompanying drawings, it is to be understood that the invention is not limited to the details of the illustrated embodiments, but may be otherwise embodied as described below.

In the illustrated embodiments, the brake pedal 10 is linked direction with the master cylinder 10 without a booster interposed therebetween, and the pressure control valve 22 and the pressure boosting device 60 are assigned to also achieve a pressure boosting function as achieved by a booster which is generally provided between the master cylinder and the brake pedal in an ordinary brake system. However, such an ordinary booster may be used together with the pressure control device 22 and the pressure boosting device 66. In this case, the load of the pressure control valve 22 is reduced, and the ordinary booster provides a fail-safe function in the event of an electrical trouble with the brake system.

The illustrated embodiments are adapted such that the electrically controlled pressure control valve 22 is controlled so as to regulate the brake cylinder pressure Pw in the anti-lock fashion so as to avoid an excessive slip of the wheel on the road surface. However, the principle of the present invention is equally applicable to a hydraulic brake system adapted to regulate the brake cylinder pressure such that the actual deceleration value of the vehicle as detected by a vehicle deceleration sensor corresponds to the depression force acting on the brake pedal 10 as detected by a force sensor. The present invention is also applicable to a hydraulic brake system adapted to apply brake to the vehicle drive wheels during acceleration of the vehicle for controlling the traction force of the drive wheels so as to avoid an excessive slip of the drive wheels, depending upon output signals of wheel speed sensors and a vehicle speed sensor. The vehicle deceleration sensor, force sensor, wheel speed sensors and vehicle speed sensor are considered to be vehicle condition sensors for detecting the condition of the vehicle.

Further, the electrically controlled pressure control valve 22 may be used to control the distribution of the braking force to the front and rear wheels and/or left and right wheels, depending upon output signals of vehicle condition sensors such as those for detecting the yaw rate and lateral acceleration of the vehicle. The pressure control valve 22 may also be used for effecting an automatic braking so as to avoid collision of the vehicle with any obstacles, depending upon output signals of vehicle condition sensors such as a distance sensor adapted to detect a distance to the preceding vehicle or similar sensor for detecting the condition in front of the vehicle.

As indicated above, the second piston 66 and the first and second sealing members 90, 94 of the pressure boosting device 60 in the illustrated embodiments cooperate to constitute a valve mechanism in the present embodiment. Although this valve mechanism is adapted such that the sealing members 90, 94 permit a flow of the fluid in one direction even when the second piston 66 is held in contact with the sealing members, the sealing members 90, 94 may be replaced by a combination of sealing members which inhibit the fluid flows in both directions, and check valves which permit the fluid flows in only one direction.

While the illustrated embodiments are adapted such that the "brake clearance" in each wheel brake cylinder 38 is eliminated primarily by the brake fluid discharged from the master cylinder 12 during an initial period of operation of the brake pedal 10, the electrically controlled pressure control valve 22 may be controlled so as to feed an appropriate amount of the fluid into the wheel brake cylinder 38 so as to eliminate the brake clearance during the initial period of operation of the brake pedal 10. In this case, the time required for the wheel brake cylinder 38 to provide an actual braking effect may be shortened.

It is to be understood that the present invention may be embodied with various other changes, modifications and improvements, which may occur to those skilled in the art, without departing from the spirit and scope of the invention defined in the following claims.

What is claimed is:

1. A pressure boosting device provided in a hydraulically operated system wherein the pressure boosting device is connected to a mechanically operated pressure control device, an electrically controlled pressure control device and a hydraulically operated actuator, said mechanically operated pressure control device producing a manually controlled hydraulic pressure whose level is regulated depending upon an operating force acting on the mechanically operated pressure control device, while said electrically controlled pressure control device producing an electrically controlled hydraulic pressure whose level is electrically regulated, said pressure boosting device comprises:

a stepped booster piston for boosting said electrically controlled hydraulic pressure produced by said electrically controlled pressure control device, so that the boosted electrically controlled hydraulic pressure is applied to said hydraulically operated actuator; and a valve mechanism operated according to a movement of said booster piston, said valve mechanism having an open position in which said actuator communicates with said mechanically operated pressure control device, and a closed position in which said actuator is disconnected from said mechanically operated pressure control device and in which said booster piston is permitted to boost said electrically controlled hydraulic pressure, said valve mechanism being placed in said open position when said booster piston is placed in an original position thereof, and in said closed position when said booster piston is moved from said original position.

2. A pressure boosting device according to claim 1, wherein said hydraulically operated system further comprises an electrically operated hydraulic pressure source, and a pressure regulator for regulating a pressure received from said hydraulic pressure source to produce a regulator pressure such that said regulator pressure is substantially equal to said manually controlled hydraulic pressure, said pressure boosting device comprising:

a housing;

a first and a second piston which are received in said housing such that said first and second pistons are concentric with each other and connected to each other for axial movement as a unit;

a third piston received in said housing such that said third piston is associated concentrically with said first and second pistons and is axially movable;

said first piston having at least a rear pressure-receiving surface remote from said second piston, said second piston having a rear and a front pressure-receiving surface, and said third piston having at least a front pressure-receiving surface;

said rear pressure-receiving surface of said first piston receiving said electrically controlled pressure, said rear and front pressure-receiving surfaces of said second piston cooperating with said housing to define a first and a second pressure chamber, respectively, and receiving said manually controlled hydraulic pressure and a pressure in said actuator, respectively, and said front pressure-receiving surface of said third piston receiving said regulator pressure produced by said pressure regulator;

a first and a second elastic sealing member which are fixedly disposed in said housing such that said second piston is movable between an advanced position and a retracted position thereof defined by said first and second sealing members, said second piston and said first and second sealing members permitting bidirectional flows of a working fluid between said first and second pressure chambers when said second piston is placed in a neutral position thereof between said advanced and retracted positions, said second piston contacting said first and second sealing members when said second piston is placed in said advanced and retracted positions, respectively, said second piston and said first and second sealing members inhibiting a flow of said fluid from said second pressure chamber toward said first pressure chamber and permitting a flow of the fluid from said first pressure chamber toward said second pressure chamber when said second piston is placed in said advanced position, said second piston and said first and second sealing members inhibiting a flow of said fluid from said first pressure chamber toward said second pressure chamber and permitting a flow of the fluid from said second pressure chamber toward said first pressure chamber when said second piston is placed in said retracted position, said second piston and said first and second sealing members constituting said valve mechanism; and said rear pressure-receiving surface of said first piston having an area larger than that of said front pressure-receiving surface of said second piston, whereby said first and second pistons cooperate to constitute said booster piston.

3. A pressure boosting device according to claim 2, wherein said front pressure-receiving surface of said third piston has an area equal to that of said rear pressure-receiving surface of said second piston.

4. A hydraulically operated brake system for a motor vehicle having at least one wheel, comprising:

a mechanically operated master cylinder for producing a manually controlled hydraulic pressure whose level is regulated depending upon an operating force acting on said master cylinder;

an electrically controlled pressure control device for producing an electrically controlled hydraulic pressure whose level is electrically regulated;

a wheel brake cylinder for braking each of said at least one wheel; and a pressure boosting device connected to said master cylinder, said electrically controlled pressure control device and said wheel brake cylinder, said pressure boosting device including (a) a stepped booster piston for boosting said electrically controlled hydraulic pressure produced by said electrically controlled pressure control device, so that the boosted electrically controlled hydraulic pressure is applied to said wheel brake cylinder, and (b) a valve mechanism operated according to a movement of said booster piston, said valve mechanism having an open position in which said wheel brake cylinder communicates with said master cylinder, and a closed position in which said wheel brake cylinder is disconnected from said master cylinder and in which said booster piston is permitted to boost said electrically controlled hydraulic pressure, said valve mechanism being placed in said open position when said booster piston is placed in an original position thereof, and in said closed position when said booster piston is moved from said original position.

5. A hydraulically operated brake system according to claim 4, further comprising a first hydraulic pressure source, and a reservoir storing a working fluid, and wherein said electrically controlled pressure control device comprises:

a spool operated for selective communication of said wheel brake cylinder with said first hydraulic pressure source and said reservoir, said spool receiving a pressure in said wheel brake cylinder and one of said manually controlled hydraulic pressure and an equivalent master cylinder pressure substantially equal to said manually controlled hydraulic pressure, said pressure in said wheel brake cylinder and said one of said manually controlled hydraulic pressure and said equivalent master cylinder pressure acting on said spool in opposite directions;

electrically operated drive force applying means for applying a magnetic drive force to said spool such that said magnetic drive force is electrically controllable;

said spool regulating the pressure in said wheel brake cylinder depending upon said one of said manually controlled hydraulic pressure and said equivalent master cylinder pressure, so as to maintain equilibrium between said pressure in said wheel brake cylinder and said one of said manually controlled hydraulic pressure and said equivalent master cylinder pressure when said magnetic drive force is not applied to said spool; and said spool and said electrically operated drive force applying means regulating said pressure in said wheel brake cylinder depending upon a sum of said magnetic drive force and a force based on said one of said manually controlled hydraulic pressure and said equivalent master cylinder pressure, so as to maintain equilibrium between a force based on said pressure in said wheel brake cylinder and said sum, when said magnetic drive force is applied to said spool.

6. A hydraulically operated brake system according to claim 5, further comprising a second hydraulic pressure source, and wherein said fist hydraulic pressure source comprises a pressure regulator for producing a regulator pressure to be applied to said electrically controlled pressure control device, said pressure regulator having a regulator pressure chamber which has said regulator pressure, said pressure regulator including:

a pilot piston which receives said manually controlled hydraulic pressure and said regulator pressure such that said manually controlled hydraulic pressure and said regulator pressure act on said pilot piston in opposite directions, said pilot piston being operated depending upon a difference between said manually controlled hydraulic pressure and said regulator pressure; and a shut-off valve which is opened and closed according to a movement of said pilot piston, to permit and inhibit communication between said second hydraulic pressure source and said regulator pressure chamber, respectively, so that said regulator pressure is substantially equal to said manually controlled hydraulic pressure.

7. A hydraulically operated brake system according to claim 6, wherein said second hydraulic pressure source comprises a pump for pressurizing said working fluid, and an accumulator for storing the pressurized fluid from said pump such that a pressure of the pressurized fluid stored in said accumulator is held within a predetermined range.

8. A hydraulically operated brake system according to claim 5, wherein said electrically controlled pressure control device further comprises:

a reaction piston which receives the pressure in said wheel brake cylinder and transmits a force based on said pressure in said wheel brake cylinder to said spool; and a pilot piston which receives as a pilot pressure said manually controlled hydraulic pressure and transmits a force based on said pilot pressure to said pilot piston such that said forces based on the pressure in said wheel brake cylinder and said pilot pressure act on said spool in opposite direction.

9. A hydraulically operated brake system according to claim 5, wherein said electrically operated drive force applying means comprises a force motor including a movable coil and a permanent magnet, said force motor generating said magnetic drive force.

10. A hydraulically operated brake system according to claim 6, wherein said pressure boosting device comprises:

a housing;

a booster piston received in said housing, said booster piston including a first and a second piston, and a first shaft portion which connects said first and second pistons such that said first and second pistons and said first shaft portion are coaxial with each other;

said first piston and said first shaft portion being fluid-tightly and axially slidably received in said housing, while said second piston being axially movably received in said housing, with an annular gap left between said second piston and said housing;

said first piston having a rear and a front pressure-receiving surface which receive said electrically controlled hydraulic pressure and an atmospheric pressure, respectively, said second piston having a rear and a front pressure-receiving surface which receive said manually controlled hydraulic pressure and the pressure in said wheel brake cylinder, respectively; and a second shaft portion extending from said second piston in a front direction away from said first piston such that said second shaft is coaxial with said first and second pistons and said first shaft portion, said second shaft portion including an end portion which is fluid-tightly and axially slidably received in said housing, said end portion of said second shaft portion functioning as a third piston having a front pressure-receiving surface which receives said regulator pressure.

11. A hydraulically operated brake system according to claim 10, wherein said rear and front pressure-receiving surfaces of said first piston cooperate with said housing to define a pressure control chamber and an atmospheric pressure chamber which communicate with said electrically controlled pressure control device and an atmosphere, respectively, and said rear and front pressure-receiving surfaces of said second piston cooperate with said housing to define a master cylinder pressure chamber and a brake cylinder pressure chamber which communicate with said master cylinder and said wheel brake cylinder, respectively, and wherein said pressure boosting device includes an elastic sealing member fixedly disposed in said housing, said second piston permitting bidirectional flows of said working fluid through said annular gap between said master cylinder pressure and said brake cylinder pressure chamber when said second piston is placed in a neutral position thereof apart from said elastic sealing member, said second piston contacting said elastic sealing member when said second piston is moved from said neutral position in a direction toward said brake cylinder pressure chamber, said second piston and said elastic sealing member inhibiting a flow of the fluid from said brake cylinder pressure chamber toward said master cylinder pressure chamber and permitting a flow of the fluid from said master cylinder pressure chamber toward said brake cylinder pressure chamber when said second piston is in contact with said elastic sealing member.

12. A hydraulically operated brake system according to claim 10, wherein said rear and front pressure-receiving surfaces of said first piston cooperate with said housing to define a pressure control chamber and an atmospheric pressure chamber which communicate with said electrically controlled pressure control device and an atmosphere, respectively, and said rear and front pressure-receiving surfaces of said second piston cooperate with said housing to define a master cylinder pressure chamber and a brake cylinder pressure chamber which communicate with said master cylinder and said wheel brake cylinder, respectively, and wherein said pressure boosting device includes an elastic sealing member fixedly disposed in said housing, said second piston permitting bidirectional flows of said working fluid through said annular gap between said master cylinder pressure and said brake cylinder pressure chamber when said second piston is placed in a neutral position thereof apart from said elastic sealing member, said second piston contacting said elastic sealing member when said second piston is moved from said neutral position in a direction toward said master cylinder pressure chamber, said second piston and said elastic sealing member inhibiting a flow of the fluid from said master cylinder pressure chamber toward said brake cylinder pressure chamber and permitting a flow of the fluid from said brake cylinder pressure chamber toward said master cylinder pressure chamber when said second piston is in contact with said elastic sealing member.

13. A hydraulically operated brake system according to claim 10, wherein said front pressure-receiving surface of said third piston has an area equal to that of said rear pressure-receiving surface of said second piston.

14. A hydraulically operated brake system according to claim 6, wherein motor vehicle has four wheels, and said wheel brake cylinder is provided for each of said four wheels, said brake system further comprising:

wheel speed sensors for detecting rotating speeds of said four wheels;

a vehicle speed sensor for detecting a running speed of said motor vehicle; and a controller for electrically controlling said electrically controlled pressure control device to regulate the pressure in said wheel brake cylinders in an anti-lock manner, on the basis of output signals of said wheel speed sensors and said vehicle speed sensor, so as to prevent an excessive slip of said each wheel on a road surface upon braking of said each wheel.

15. A hydraulically operated brake system according to claim 14, wherein said electrically controlled pressure control device and said pressure boosting device are provided for each of said wheel brake cylinders of said four wheels, and wherein said master cylinder has two mutually independent pressurizing chambers, said pressure regulator being provided for each of said two mutually independent pressurizing chambers of said master cylinder.

16. A hydraulically operated brake system according to claim 14, wherein said electrically controlled pressure control device and said pressure boosting device are provided for each of said wheel brake cylinders of said four wheels, and wherein said master cylinder has two mutually independent pressurizing chambers, said pressure regulator being provided commonly for said two mutually independent pressurizing chambers of said master cylinder.

17. A hydraulically operated brake system according to claim 14, wherein said master cylinder has two mutually independent pressurizing chambers, one of said two pressurizing chambers being connected to the two wheel brake cylinders of two of said four wheels through said electrically controlled pressure control device and said pressure boosting device, the other of said two pressurizing chambers being connected directly to the two wheel brake cylinders of the other of said four wheels.

18. A hydraulically operated brake system according to claim 14, wherein said electrically controlled pressure control device and said pressure boosting device are provided for each of the wheel brake cylinders of said four wheels, and said master cylinder has two mutually independent pressurizing chambers, each of said two pressurizing chambers being connected directly to the two electrically controlled pressure control device and the two pressure boosting device which correspond to said each pressurizing chamber.

* * * * *